United States Patent
Aoki et al.

(10) Patent No.: US 10,770,998 B2
(45) Date of Patent: Sep. 8, 2020

(54) CONTROL APPARATUS FOR ROTATING ELECTRIC MACHINE

(71) Applicant: DENSO CORPORATION, Kariya, Aichi-pref. (JP)

(72) Inventors: Yasuaki Aoki, Kariya (JP); Shinji Makita, Kariya (JP)

(73) Assignee: DENSO CORPORATION, Kariya (JP)

( * ) Notice: Subject to any disclaimer, the term of this patent is extended or adjusted under 35 U.S.C. 154(b) by 95 days.

(21) Appl. No.: 15/978,297

(22) Filed: May 14, 2018

(65) Prior Publication Data

US 2018/0331645 A1 Nov. 15, 2018

(30) Foreign Application Priority Data

May 12, 2017 (JP) .................................. 2017-095567

(51) Int. Cl.
```
H02P 21/22      (2016.01)
H02M 7/483      (2007.01)
H02M 7/5387     (2007.01)
H02M 1/15       (2006.01)
```

(52) U.S. Cl.
CPC .............. *H02P 21/22* (2016.02); *H02M 1/15* (2013.01); *H02M 7/483* (2013.01); *H02M 7/53875* (2013.01); H02M 2007/53876 (2013.01)

(58) Field of Classification Search
CPC ................................ H02M 7/483; H02P 21/22

USPC .......................................................... 318/558
See application file for complete search history.

(56) References Cited

U.S. PATENT DOCUMENTS

2010/0060211 A1* 3/2010 Hashimoto ............. H02P 27/08
318/400.02

FOREIGN PATENT DOCUMENTS

| JP | 2004312822 A | * | 11/2004 |
| JP | 4143918 B2 | | 9/2008 |

* cited by examiner

*Primary Examiner* — Jorge L Carrasquillo
(74) *Attorney, Agent, or Firm* — Oliff PLC

(57) ABSTRACT

A control apparatus for is a rotating electric machine applied to a control system including a power conversion circuit, a rotating electric machine, and a capacitor. The control apparatus selects two types of active voltage vectors that sandwich a command voltage vector that is applied to a rotating electric machine from a power conversion circuit and have a phase difference of 60 degrees therebetween. The control apparatus selects, of two types of active voltage vectors that sandwich the command voltage vector and have a phase difference of 120 degrees therebetween, one of two types of active voltage vectors that differs from the two types of active voltage vectors selected earlier, based on a driving state of the rotating electric machine. The control apparatus controls the power conversion apparatus to perform switching operations to control the rotating electric machine, based on the selected three types of active voltage vectors.

13 Claims, 19 Drawing Sheets

FIG.1
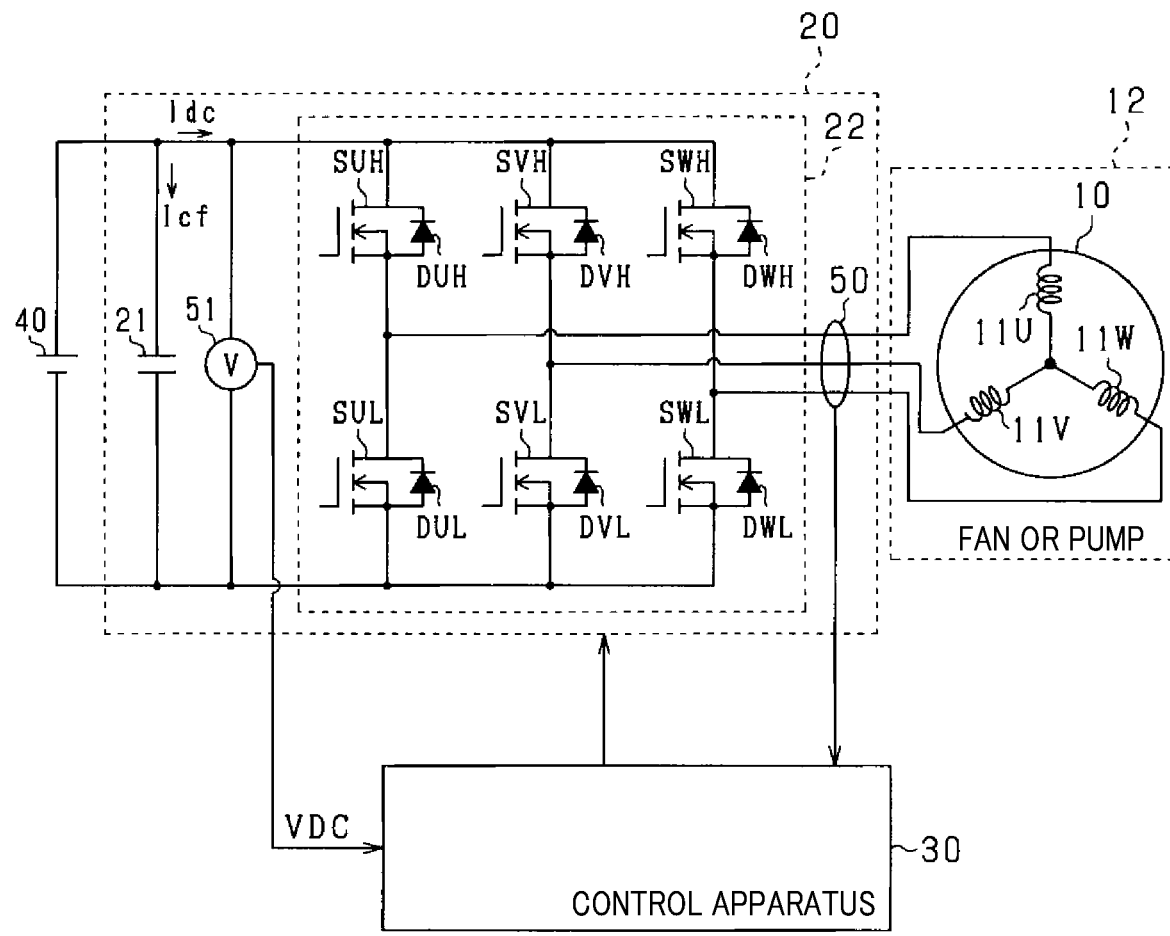
FIG.2A
Idc
FIG.2B
Icf
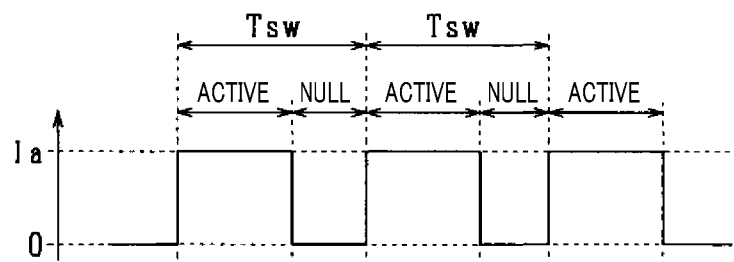
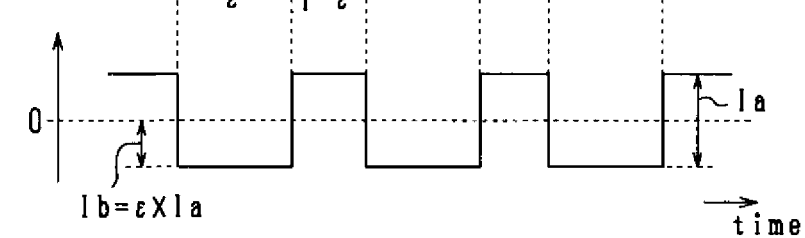

FIG.5

|     | V0    | V1    | V2    | V3    | V4    | V5    | V6    | V7    |
|-----|-------|-------|-------|-------|-------|-------|-------|-------|
| U   | 0     | 1     | 1     | 0     | 0     | 0     | 1     | 1     |
| V   | 0     | 0     | 1     | 1     | 1     | 0     | 0     | 1     |
| W   | 0     | 0     | 0     | 0     | 1     | 1     | 1     | 1     |
| Vu  | -Ed/2 | Ed/2  | Ed/2  | -Ed/2 | -Ed/2 | -Ed/2 | Ed/2  | Ed/2  |
| Vv  | -Ed/2 | -Ed/2 | Ed/2  | Ed/2  | Ed/2  | -Ed/2 | -Ed/2 | Ed/2  |
| Vw  | -Ed/2 | -Ed/2 | -Ed/2 | -Ed/2 | Ed/2  | Ed/2  | Ed/2  | Ed/2  |
| Vαβ | 0 | $\sqrt{\frac{2}{3}}E_d e^{j0}$ | $\sqrt{\frac{2}{3}}E_d e^{j\frac{\pi}{3}}$ | $\sqrt{\frac{2}{3}}E_d e^{j\frac{2\pi}{3}}$ | $\sqrt{\frac{2}{3}}E_d e^{j\pi}$ | $\sqrt{\frac{2}{3}}E_d e^{j\frac{4\pi}{3}}$ | $\sqrt{\frac{2}{3}}E_d e^{j\frac{5\pi}{3}}$ | 0 |

FIG.6A
60-DEGREE VOLTAGE VECTORS
FIG.6B
120-DEGREE VOLTAGE VECTORS
FIG.6C
RESULTANT VOLTAGE VECTORS
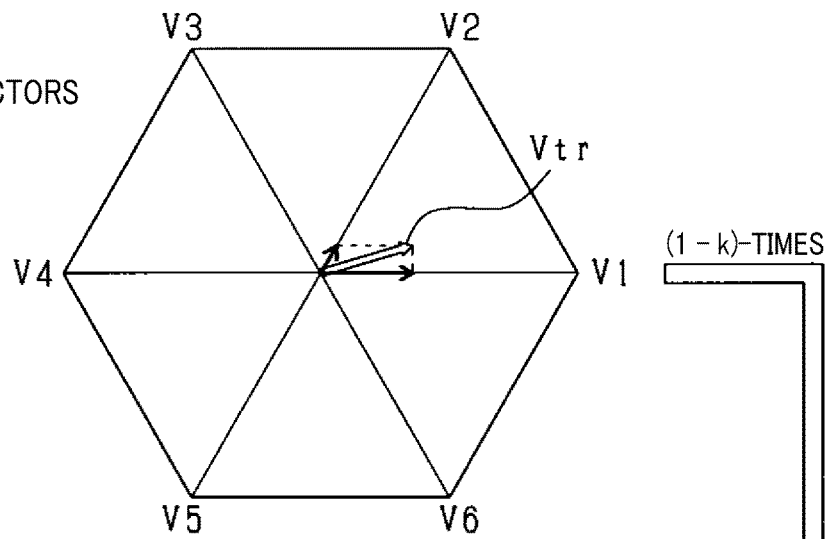
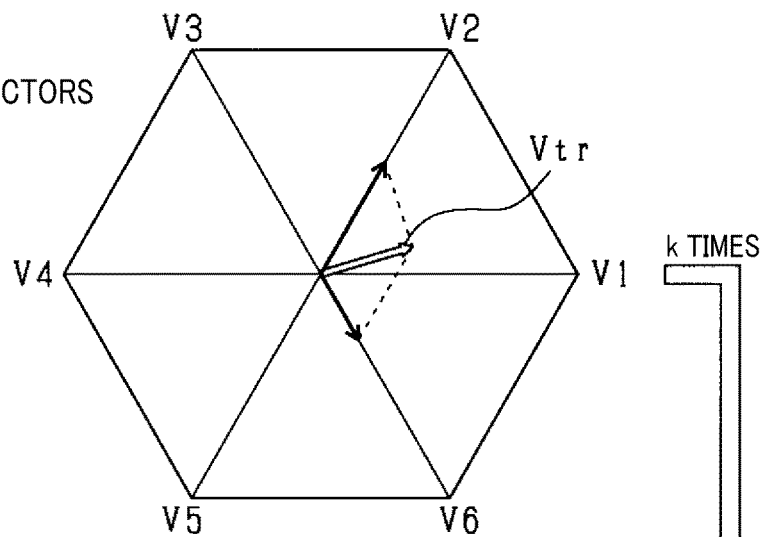
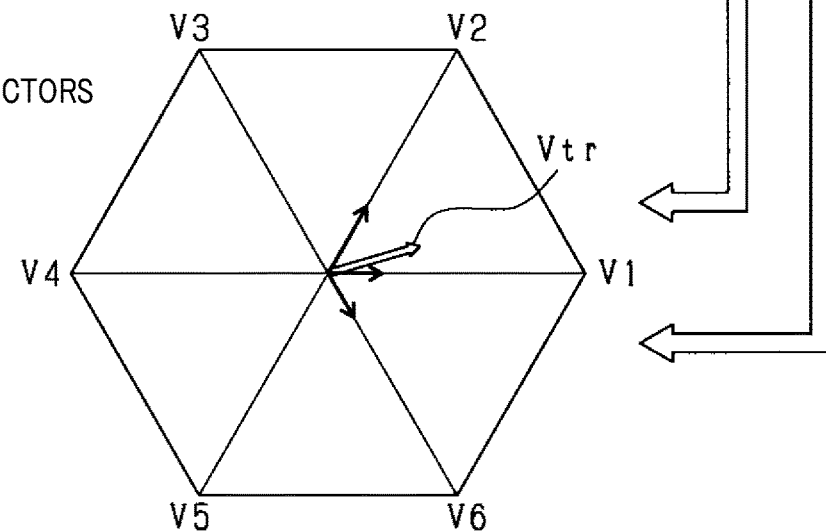

FIG. 7A  60-DEGREE VOLTAGE VECTORS
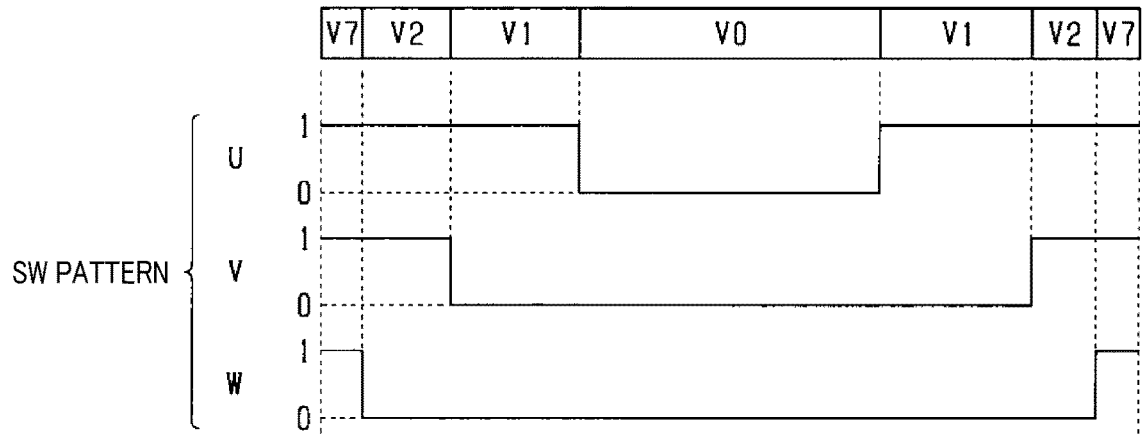
FIG. 7B  120-DEGREE VOLTAGE VECTORS
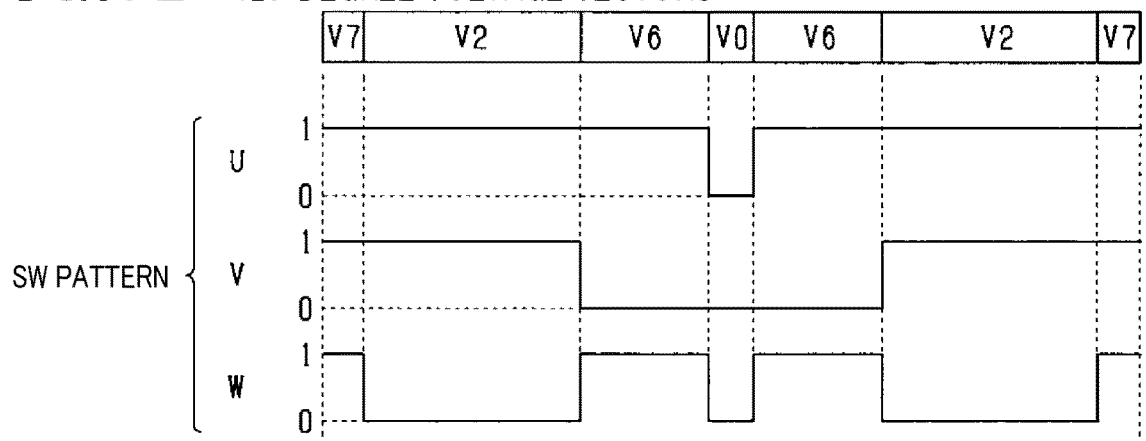
FIG. 7C  RESULTANT VOLTAGE VECTORS
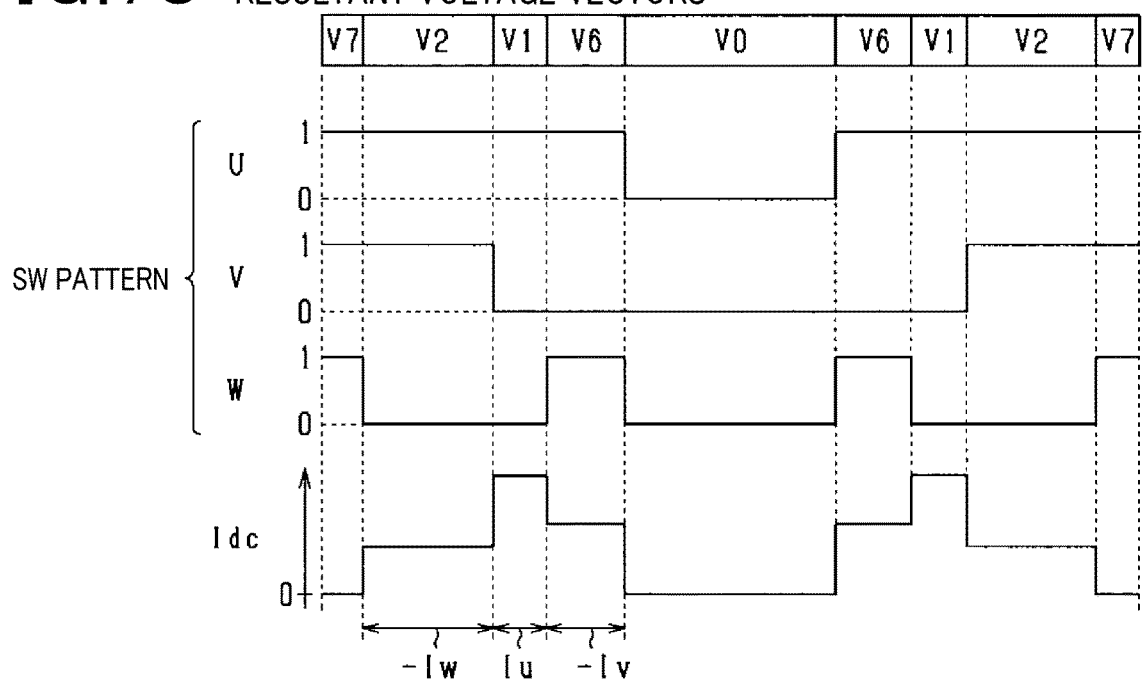

FIG.9

| VECTOR / SECTION | V0 | V1 | V2 | V3 | V4 | V5 | V6 | V7 |
|---|---|---|---|---|---|---|---|---|
| 1-A | 0 | $(1-k)\dfrac{v_u-v_v}{E_d}$ | $\dfrac{kv_u+(1-k)v_v-v_w}{E_d}$ | 0 | 0 | 0 | $k\dfrac{v_u-v_v}{E_d}$ | $1-\dfrac{(1+k)v_u-kv_v-v_w}{E_d}$ |
| 1-B | $1-\dfrac{v_u+kv_v-(1+k)v_w}{E_d}$ | $\dfrac{v_u-(1-k)v_v-kv_w}{E_d}$ | $(1-k)\dfrac{v_v-v_w}{E_d}$ | $k\dfrac{v_v-v_w}{E_d}$ | 0 | 0 | 0 | 0 |
| 2-B | $1-\dfrac{kv_u+v_v-(1+k)v_w}{E_d}$ | $\dfrac{v_u-v_w}{E_d}$ | $(1-k)\dfrac{v_v-v_w}{E_d}$ | $\dfrac{-(1-k)v_u+v_v-kv_w}{E_d}$ | 0 | 0 | 0 | 0 |
| 2-C | 0 | 0 | $(1-k)\dfrac{v_u-v_w}{E_d}$ | $(1-k)\dfrac{v_v-v_u}{E_d}$ | $k\dfrac{v_v-v_u}{E_d}$ | 0 | 0 | $1-\dfrac{-kv_u+(1+k)v_v-v_w}{E_d}$ |
| 3-C | 0 | 0 | $k\dfrac{v_u-v_w}{E_d}$ | $\dfrac{-kv_u+v_v-(1-k)v_w}{E_d}$ | $\dfrac{-v_u+kv_v+(1-k)v_w}{E_d}$ | 0 | 0 | $1-\dfrac{-v_u+(1+k)v_v-kv_w}{E_d}$ |
| 3-D | $1-\dfrac{kv_u-(1+k)v_v+v_w}{E_d}$ | 0 | 0 | 0 | $(1-k)\dfrac{v_w-v_v}{E_d}$ | $k\dfrac{v_w-v_v}{E_d}$ | 0 | 0 |
| 4-D | $1-\dfrac{v_u-(1+k)v_v+kv_w}{E_d}$ | 0 | 0 | 0 | $\dfrac{-v_u+(1-k)v_v+kv_w}{E_d}$ | $\dfrac{-kv_u-(1-k)v_v+v_w}{E_d}$ | $(1-k)\dfrac{v_w-v_v}{E_d}$ | 0 |
| 4-E | 0 | 0 | 0 | 0 | $k\dfrac{v_w-v_u}{E_d}$ | $(1-k)\dfrac{v_w-v_u}{E_d}$ | $(1-k)\dfrac{v_v-v_u}{E_d}$ | $1-\dfrac{-v_u-kv_v+(1+k)v_w}{E_d}$ |
| 5-E | 0 | 0 | 0 | 0 | 0 | $(1-k)\dfrac{v_w-v_u}{E_d}$ | $(1-k)\dfrac{v_v-v_u}{E_d}$ | $1-\dfrac{-kv_u-v_v+(1+k)v_w}{E_d}$ |
| 5-F | $1-\dfrac{kv_u-v_v+v_w}{E_d}$ | $k\dfrac{v_u-v_v}{E_d}$ | 0 | 0 | 0 | $\dfrac{-(1-k)v_u-kv_v+v_w}{E_d}$ | $(1-k)\dfrac{v_w-v_v}{E_d}$ | 0 |
| 6-F | $1-\dfrac{v_u-(1+k)v_v+kv_w}{E_d}$ | $\dfrac{v_u-kv_v-(1-k)v_w}{E_d}$ | 0 | 0 | 0 | $k\dfrac{v_w-v_v}{E_d}$ | $(1-k)\dfrac{v_w-v_v}{E_d}$ | 0 |
| 6-A | 0 | $(1-k)\dfrac{v_u-v_w}{E_d}$ | $k\dfrac{v_u-v_w}{E_d}$ | 0 | 0 | 0 | $\dfrac{kv_u-v_v+(1-k)v_w}{E_d}$ | $1-\dfrac{(1+k)v_u-v_v-kv_w}{E_d}$ |

FIG.11

RATIOS FOR 60-DEGREE VOLTAGE VECTORS

| SECTION \ VECTOR | V0 | V1 | V2 | V3 | V4 | V5 | V6 | V7 |
|---|---|---|---|---|---|---|---|---|
| 1 | $1-\dfrac{\dfrac{v_u-v_w}{E_d}}{2}$ | $\dfrac{v_u-v_v}{E_d}$ | $\dfrac{v_v-v_w}{E_d}$ | 0 | 0 | 0 | 0 | $1-\dfrac{\dfrac{v_u-v_w}{E_d}}{2}$ |
| 2 | $1-\dfrac{\dfrac{v_v-v_w}{E_d}}{2}$ | 0 | $\dfrac{v_u-v_w}{E_d}$ | $\dfrac{v_v-v_u}{E_d}$ | 0 | 0 | 0 | $1-\dfrac{\dfrac{v_v-v_w}{E_d}}{2}$ |
| 3 | $1-\dfrac{\dfrac{v_v-v_u}{E_d}}{2}$ | 0 | 0 | $\dfrac{v_v-v_w}{E_d}$ | $\dfrac{v_w-v_u}{E_d}$ | 0 | 0 | $1-\dfrac{\dfrac{v_v-v_u}{E_d}}{2}$ |
| 4 | $1-\dfrac{\dfrac{v_w-v_u}{E_d}}{2}$ | 0 | 0 | 0 | $\dfrac{v_v-v_u}{E_d}$ | $\dfrac{v_w-v_v}{E_d}$ | 0 | $1-\dfrac{\dfrac{v_w-v_u}{E_d}}{2}$ |
| 5 | $1-\dfrac{\dfrac{v_w-v_v}{E_d}}{2}$ | 0 | 0 | 0 | 0 | $\dfrac{v_w-v_u}{E_d}$ | $\dfrac{v_u-v_v}{E_d}$ | $1-\dfrac{\dfrac{v_w-v_v}{E_d}}{2}$ |
| 6 | $1-\dfrac{\dfrac{v_u-v_v}{E_d}}{2}$ | $\dfrac{v_u-v_w}{E_d}$ | 0 | 0 | 0 | 0 | $\dfrac{v_w-v_v}{E_d}$ | $1-\dfrac{\dfrac{v_u-v_v}{E_d}}{2}$ |

FIG.13

RATIOS FOR 120-DEGREE VOLTAGE VECTORS

| SECTION \ VECTOR | V0 | V1 | V2 | V3 | V4 | V5 | V6 | V7 |
|---|---|---|---|---|---|---|---|---|
| A | 0 | 0 | $\dfrac{v_u - v_w}{E_d}$ | 0 | 0 | 0 | $\dfrac{v_u - v_v}{E_d}$ | $1 - \dfrac{3v_u}{E_d}$ |
| B | $1 + \dfrac{3v_w}{E_d}$ | $\dfrac{v_u - v_w}{E_d}$ | 0 | $\dfrac{v_v - v_w}{E_d}$ | 0 | 0 | 0 | 0 |
| C | 0 | 0 | $\dfrac{v_v - v_w}{E_d}$ | 0 | $\dfrac{v_v - v_u}{E_d}$ | 0 | 0 | $1 - \dfrac{3v_v}{E_d}$ |
| D | $1 + \dfrac{3v_u}{E_d}$ | 0 | 0 | $\dfrac{v_v - v_u}{E_d}$ | 0 | $\dfrac{v_w - v_u}{E_d}$ | 0 | 0 |
| E | 0 | 0 | 0 | 0 | $\dfrac{v_w - v_u}{E_d}$ | 0 | $\dfrac{v_w - v_v}{E_d}$ | $1 - \dfrac{3v_w}{E_d}$ |
| F | $1 + \dfrac{3v_v}{E_d}$ | $\dfrac{v_u - v_v}{E_d}$ | 0 | 0 | 0 | $\dfrac{v_w - v_v}{E_d}$ | 0 | 0 |

PRESENT EMBODIMENT

COMPARISON EXAMPLE

CONTROL APPARATUS FOR ROTATING ELECTRIC MACHINE

CROSS-REFERENCE TO RELATED APPLICATION

This application is based on and claims the benefit of priority from Japanese Patent Application No. 2017-095567, filed May 12, 2017. The entire disclosure of the above application is incorporated herein by reference.

BACKGROUND

Technical Field

The present disclosure relates to a control apparatus for a rotating electric machine that is applied to a control system, the control system including a power conversion circuit that is operated by a switching operation, a rotating electric machine to which alternating-current power outputted from the power conversion circuit is supplied, and a capacitor that is provided on an input side of the power conversion circuit.

Related Art

The following control apparatus is known as the above-described type of control apparatus. That is, the control apparatus operates the power conversion circuit by a switching operation based on two types of active voltage vectors that sandwich a command voltage vector of the power conversion apparatus and have a phase difference of 60 degrees therebetween. In this operating method, appearance time of the active voltage vectors becomes shorter and appearance time of null voltage vectors (zero voltage vector) becomes longer, during a single switching period of the power conversion circuit. As a result, a ripple current that flows to a capacitor increases.

As a technology for solving this problem, Japanese Patent Publication No. 4143918 discloses a control apparatus that operates the power conversion circuit based on two types of active voltage vectors that sandwich the command voltage vector and have a phase difference of 120 degrees therebetween. As a result of this technology, the appearance time of the active voltage vectors during a single switching period can be increased and the ripple current that flows to the capacitor can be reduced.

However, in the operating method based on the two types of active voltage vectors that have a phase difference of 120 degrees therebetween, a maximum value of a magnitude of a voltage vector that can be outputted from the power conversion circuit decreases, compared to the operating method based on the two types of active voltage vectors that have a phase difference of 60 degrees therebetween. That is, a maximum modulation ratio of an output voltage of the power conversion circuit decreases. Therefore, in a high modulation-ratio range in which the modulation ratio is greater than a predetermined value, the operating method based on the two types of active voltage vectors that have a phase difference of 120 degrees therebetween cannot be used. The ripple current that flows to the capacitor may not be reduced.

SUMMARY

It is thus desired to provide a control apparatus for a rotating electric machine that is capable of reducing a ripple current that flows to a capacitor in a high modulation-ratio range.

An exemplary embodiment of the present disclosure provides a control apparatus for a rotating electric machine. The control apparatus is applied to a control system that includes: a power conversion circuit that performs switching operations to convert direct-current power from a direct-current power supply (40) to alternating-current power and to output the alternating-current power; a rotating electric machine to which the alternating-current power outputted from the power conversion circuit is supplied; and a capacitor that is connected in parallel to the direct-current power supply and provided on an input side of the power conversion circuit. The control apparatus includes: a first selecting unit that selects two types of active voltage vectors that sandwich a command voltage vector applied to the rotating electric machine from the power conversion circuit and have a phase difference of 60 degrees therebetween; a second selecting unit that selects, of two types of active voltage vectors that sandwich the command voltage vector and have a phase difference of 120 degrees therebetween, one of two types of active voltage vector that differs from the active voltage vectors selected by the first selecting unit, based on a driving state of the rotating electric machine; and an operating unit that controls the power conversion apparatus to perform switching operations to control the rotating electric machine, based on the two types of active voltage vectors selected by the first selecting unit and the one of two types of active voltage vectors selected by the second selecting unit.

When appearance times of the two types of active voltage vectors that have a phase difference of 60 degrees increase during a single switching period of the power conversion circuit, a maximum value of a magnitude of a voltage vector that can be outputted increases. Meanwhile, when appearance times of the two types of active voltage vectors that have a phase difference of 120 degrees increase during the single switching period, the effect of reducing a ripple current that flows to the capacitor increases. Therefore, as a result of the two types of active voltage vectors that have a phase difference of 60 degrees and the two types of active voltage vectors that have a phase difference of 120 degrees both appearing during the single switching period, the effect of reducing the ripple current that flows to the capacitor can be achieved while increasing the maximum value of the magnitude of the voltage vector that can be outputted.

In light of the foregoing, in the exemplary embodiment, the first selecting unit selects the two types of active voltage vectors that have a phase difference of 60 degrees. In addition, the second selecting unit selects, of the two types of active voltage vectors that have a phase difference of 120 degrees, one type of active voltage vector that differs from the active voltage vectors selected by the first selecting unit, based on the driving state of the rotating electric machine. Here, the selection is made based on the driving state because the appropriate active voltage vector for achieving the ripple-current reduction effect varies based on the driving state.

The power conversion circuit is operated by a switching operation to control the rotating electric machine based on the three types of active voltage vectors selected by the first selecting unit and the second selecting unit. Therefore, the two types of active voltage vectors that have a phase difference of 120 degrees can be used even in a high modulation-ratio range, and the ripple current that flows to the capacitor can be reduced.

BRIEF DESCRIPTION OF THE DRAWINGS

In the accompanying drawings:

FIG. 1 is an overall configuration diagram of a control system of a rotating electric machine according to a first embodiment;

FIG. 2A and FIG. 2B are schematic diagrams of transitions in an inverter current and a capacitor current;

FIG. 5 is a diagram of relationships among voltage vectors, a switching pattern of each phase, each phase voltage, and a space vector;

FIG. 6A to FIG. 6C are diagrams of 60-degree voltage vectors, 120-degree voltage vectors, and resultant vectors;

FIG. 7A to FIG. 7C are diagrams of transitions in a switching pattern corresponding to the 60-degree voltage vectors, the 120-degree voltage vectors, and the resultant vectors;

FIG. 9 is a diagram of the voltage vectors used in each of the twelve sections, and a ratio of appearance time of each voltage vector during a single switching period;

FIG. 11 is a diagram of the voltage vectors used in each of the six sections, and a ratio of appearance time of each voltage vector during a single switching period;

FIG. 13 is a diagram of the voltage vectors used in each of the six sections, and a ratio of appearance time of each voltage vector during a single switching period;

DESCRIPTION OF THE EMBODIMENTS

First Embodiment

Figure 3:
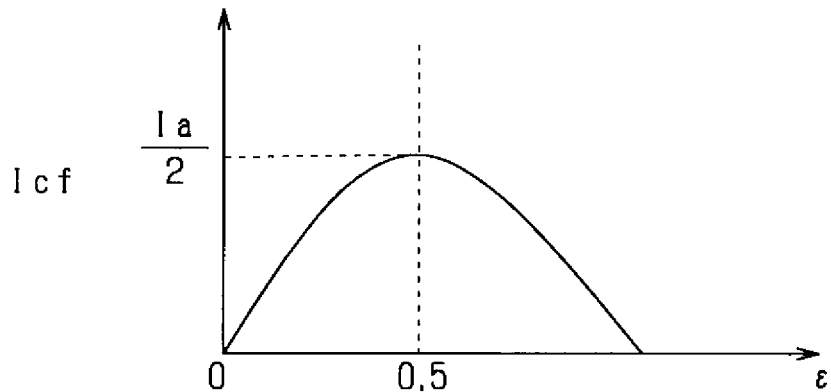
FIG. 3 is a diagram of an aspect of increase in a ripple current.

A first embodiment actualizing a control apparatus of the present disclosure will hereinafter be described with reference to the drawings. The control apparatus according to the present embodiment is applied to a three-phase inverter that is connected to a three-phase rotating electric machine.

As shown in FIG. 1, a control system includes a rotating electric machine 10, an inverter 20, and a control apparatus 30. According to the present embodiment, a brushless synchronous machine is used as the rotating electric machine 10. For example, a permanent magnet synchronous machine can be used as the synchronous machine.

According to the present embodiment, the rotating electric machine 10 configures a drive apparatus 12 that includes a fan or a pump. The rotating electric machine 10 drives the fan or the pump. For example, the fan is a radiator fan or a fan for in-cabin air-conditioning. For example, the pump is an oil pump or a water pump.

The rotating electric machine 10 is connected to a battery 40 with the inverter 20 therebetween. The battery 40 serves as a direct-current power supply. The inverter 20 includes a power conversion circuit 22. The power conversion circuit 22 includes series-connection bodies that are composed of upper arm switches SUH, SVH, and SWH, and lower arm switches SUL, SVL, and SWL.

A first end of a U-phase winding 11U of the rotating electric machine 10 is connected to a connection point between the U-phase upper and lower arm switches SUH and SUL. A first end of a V-phase winding 11V of the rotating electric machine 10 is connected to a connection point between the V-phase upper and lower arm switches SVH and SVL. A first end of a W-phase winding 11W of the rotating electric machine 10 is connected to a connection point between the W-phase upper and lower arm switches SWH and SWL Respective second ends of the U-, V-, and W-phase windings 11U, 11V, and 11W are connected by a neutral point. According to the present embodiment, the U-, V-, and W-phase windings 11U, 11V, and 11W are inductive loads and shifted from each other by an electrical angle of 120 degrees.

The inverter 20 includes a capacitor 21 on an input side thereof. The capacitor 21 smoothens an input voltage of the inverter 20. Specifically, a high-potential-side terminal of the capacitor 21 is connected to an electrical path that connects a positive terminal of the battery 40 and respective drains of the upper arm switches SUH to SWH. A low-potential-side terminal of the capacitor 21 is connected to an electrical path that connects a negative terminal of the battery 40 and respective sources of the lower arm switches SUL to SWL.

According to the present embodiment, voltage-controlled semiconductor switching elements are used as the switches SUH, SUL, SVH, SVL, SWH, and SWL. More specifically, N-channel metal-oxide-semiconductor field-effect transistors (MOSFETs) are used. The switches SUH, SUL, SVH, SVL, SWH, and SWL are respectively provided with parasitic diodes DUH, DUL, DVH, DVL, DWH, and DWL.

The control system includes a current detecting unit 50 and a voltage detecting unit 51. The current detecting unit 50 detects currents of at least two phases, among phase currents flowing to the rotating electric machine 10. The voltage detecting unit 51 detects a terminal voltage of the capacitor 21 as a power supply voltage VDC. Detection values of the current detecting unit 50 and the voltage detecting unit 51 are inputted to the control apparatus 30.

The control apparatus 30 is mainly configured by a microcomputer. The control unit 30 performs a switching operation of the inverter 20 to perform feedback control to control a controlled variable of the rotating electric machine 10 to a command value thereof. According to the present embodiment, the controlled variable is a rotational speed.

The command value thereof is a command rotational speed Ntgt. The control apparatus 30 calculates a command voltage vector Vtr for controlling the rotational speed to the command rotational speed Ntgt. As a result of the switching operation of the inverter 20 being performed such that a voltage vector applied to the rotating electric machine 10 is the command voltage vector Vtr, sine-wave phase currents that are shifted from each other by 120 degrees flow to the rotating electric machine 10.

The control apparatus 30 is configured to acquire an electrical angle θe of the rotating electric machine 10. For example, the control apparatus 30 performs position sensorless control and estimates the electrical angle θe during this control. The position sensorless control is control of the rotating electric machine 10 that is performed without use of rotation angle information of the rotating electric machine 10 detected by a rotation angle detecting unit, such as a Hall element or a resolver.

Here, the control apparatus 30 actualizes various control functions by running a program stored in a storage unit that is provided in the control apparatus 30 itself. The various control functions may be actualized by an electronic circuit, which is hardware. Alternatively, the various control functions may be actualized by both hardware and software.

Next, a ripple current that flows to the capacitor 21 will be described with reference to FIG. 2A and FIG. 2B, and FIG. 3.

FIG. 2A shows transitions in an inverter current Idc. FIG. 2B shows transitions in a capacitor current Icf that is a current flowing to the capacitor 21. The inverter current Idc is a current that flows from a connection point between a high-potential-side terminal of the capacitor 21 and the electrical path that connects the positive terminal of the battery 40 and the respective drains of the upper arm switches SUH to SWH, towards the respective drains of the upper arm switches SUH to SWH. A direction in which the inverter current Idc flows from the connection point towards the respective drains of the upper arm switches SUH to SWH is defined as a positive direction. A direction in which the capacitor current Icf flows from the connection point towards the high-potential-side terminal of the capacitor 21 is defined as a positive direction.

For simplification, in FIG. 2A and FIG. 2B, a period ε (0<ε<1) during which the voltage vector that is applied to the rotating electric machine 10 is an active voltage vector and a period "1−ε" during which the voltage vector is a null voltage vector (zero voltage vector) appear in an alternating manner. Here, ε is determined based on a switching pattern of each switch configuring the power conversion circuit 22, and the like. In FIG. 2, Tsw denotes a single switching period of the switches configuring the power conversion circuit 22. Ia denotes a magnitude of the inverter current Idc that flows during the period during which the voltage vector is an active voltage vector.

During the period during which the voltage vector is an active voltage vector, the capacitor 21 performs discharge. Therefore, the capacitor current Icf is a negative value. The magnitude of a discharge current of the capacitor 21 is Ib (=ε×Ia). Meanwhile, during the period during which the voltage vector is a null voltage vector, the capacitor 21 is charged by a current supplied from the battery 40. Therefore, the capacitor current Icf is a positive value.

A difference between the capacitor current Icf during the period during which the voltage vector is an active voltage vector and the capacitor current Icf during the period during which the voltage vector is a null voltage vector indicates a magnitude Ia of the ripple current that flows to the capacitor 21. An effective value Icfrms of the ripple current is expressed by an expression (eq1) below.

$$Icf_{rms} = \sqrt{\int_0^\varepsilon \sqrt{(Ia - \varepsilon \cdot Ia)^2} \, dt + \int_\varepsilon^1 \sqrt{(-\varepsilon \cdot Ia)^2} \, dt} \quad \text{(eq1)}$$
$$= 2Ia \cdot \varepsilon (1 - \varepsilon)$$

The right side of the expression (eq1) above becomes a maximum value Ia/2 when ε=0.5. Thus, to reduce the effective value Icfrms of the ripple current, ε that is correlated to a modulation ratio is required to be set away from 0.5. In terms of controlling the rotational speed of the rotating electric machine 10 to the command rotational speed Ntgt while the fan or the pump is receiving external load, ε is required to be increased. Therefore, ε is set away from 0.5 by being set to be greater than 0.5 to reduce the effective value Icfrms of the ripple current.

When ε is increased, the period during which the voltage vector is a null voltage vector becomes shorter and the period during which the voltage vector is an active voltage vector becomes longer during the single switching period Tsw. To shorten the period during which the voltage vector is a null voltage vector, two types of active voltage vectors are used. The two types of active voltage vectors sandwich the command voltage vector Vtr and have a phase difference of 120 degrees therebetween, in terms of electrical angle. Hereafter, the two types of active voltage vectors that have a phase difference of 120 degrees are referred to as 120-degree voltage vectors.

However, when the 120-degree voltage vectors are used, the maximum value of the magnitude of the voltage vector decreases, compared to when two types of active voltage vectors that have a phase difference of 60 degrees therebetween are used. Hereafter, the two types of active voltage vectors that have a phase difference of 60 degrees are referred to as 60-degree voltage vectors.

Figure 4:
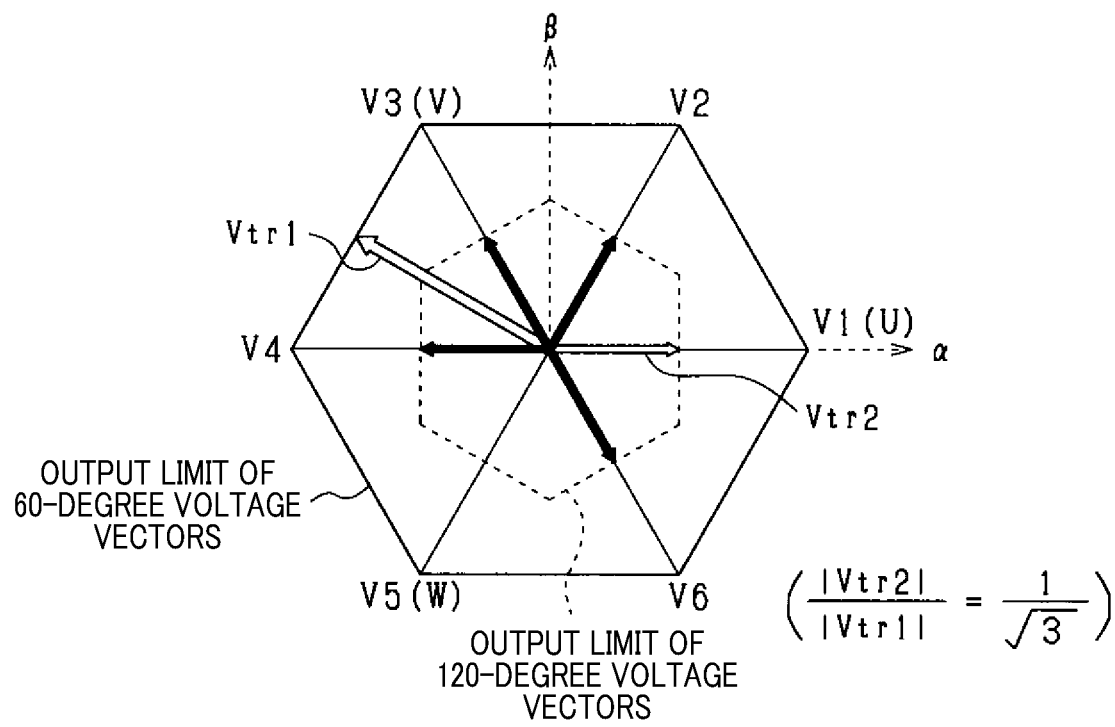
FIG. 4 is a diagram of output limits regarding 60-degree voltage vectors and 120-degree voltage vectors.

In FIG. 4, solid lines show an outline of a hexagon of a space vector that can be actualized by the 60-degree voltage vectors. Broken lines show an outline of a hexagon of a space vector that can be actualized by the 120-degree voltage vectors. A voltage vector Vtr1 and a voltage vector Vtr2 are shown as examples in FIG. 4. The voltage vector Vtr1 is generated when a third voltage vector V3 and a fourth voltage vector V4 are used as the 60-degree voltage vectors. The voltage vector Vtr2 is generated when a second voltage vector V2 and a sixth voltage vector V6 are used as the 120-degree voltage vectors.

FIG. 4 also shows α and β axes that prescribe a two-phase stationary reference frame (two-phase stationary coordinate system) of the rotating electric machine 10, and the U, V, and W phases of a three-phase stationary reference frame (three-phase stationary coordinate system) of the rotating electric machine 10. In FIG. 4, the U phase coincides with the a axis. In addition, active voltage vectors V1 to V6 and null voltage vectors V0 and V7 shown in FIG. 4 are generated by the switching patterns shown in FIG. 5.

In FIG. 5, "1" in the U, V, and W rows indicates that the upper arm switch is turned on and the lower arm switch is turned off. "0" indicates that the lower arm switch is turned on and the upper arm switch is turned off. In addition, FIG. 5 shows the U-, V-, and W-phase voltages Vu, Vv, and Vw that correspond to the voltage vectors V0 to V7. Ed/2 corresponds to the power supply voltage VDC that is the voltage at the positive terminal side of the battery 40, whereas −Ed/2 corresponds to zero that is the voltage at the negative terminal side of the battery 40.

As shown in FIG. 4, the maximum value of the magnitude of the voltage vector that can be generated by the 120-degree vectors is 110 (square root of 3) of the maximum value of the magnitude of the voltage vector that can be generated by the 60-degree voltage vectors. Therefore, when the modulation ratio is high, the method for reducing the ripple current through use of the 120-degree voltage vectors cannot be used.

Therefore, according to the present embodiment, as shown in FIG. 6, the command voltage vector Vtr is generated by both the 60-degree voltage vectors and the 120-degree voltage vectors in the high modulation-ratio range. As a result of the 60-degree voltage vectors being used, the maximum value of the magnitude of the voltage vector can be increased.

In addition, as a result of the 120-degree voltage vectors being used, the ripple-current reduction effect can be achieved. Therefore, according to the present embodiment, the ripple current that flows to the capacitor 21 in the high modulation-ratio range can be reduced.

According to the present embodiment, a ratio of a period during which a 60-degree voltage vector Vαβ1 is used and a period during which a 120-degree voltage vector Vαβ2 is used during a period during which an active voltage vector is selected during the single switching period Tsw is prescribed based on a ratio coefficient k (0≤k≤1), as expressed in an expression (eq2) below.

$$V_{tr} = (1-k)V_{\alpha\beta 1} + k \cdot V_{\alpha\beta 2} \tag{eq2}$$

FIG. 7A shows an example of the voltage vectors and transitions in the switching pattern during the single switching period Tsw when only the 60-degree voltage vectors are used. FIG. 7B shows an example of the voltage vectors and the transitions in the switching pattern during the single switching period Tsw when only the 120-degree voltage vectors are used. FIG. 7C shows an example of the voltage vectors and the transitions in the switching pattern during the single switching period Tsw when both 60-degree voltage vectors and 120-degree voltage vectors are used.

Figure 8:
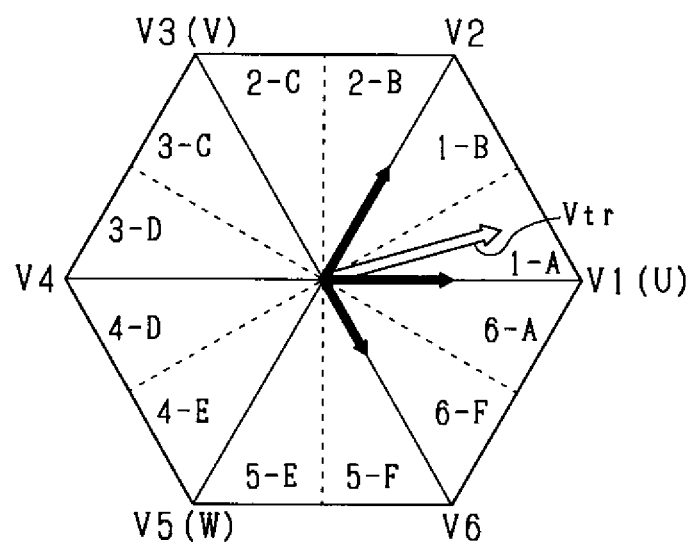
FIG. 8 is a diagram of a hexagonal space vector that is divided into twelve sections.

FIG. 8 shows twelve sections (sectors) that are arranged with a phase difference of 30 degrees. The voltage vectors that are used to control the rotating electric machine 10 are determined through determination of the section to which the command voltage vector Vtr belongs.

In FIG. 9, a time ratio at which each voltage vector appears during the single switching period Tsw is indicated using the ratio coefficient k, the phase voltages, and Ed, for each section. For example, when the command voltage vector Vtr belongs to a section 1-A, the first, second, and sixth vectors V1, V2, and V6, and the seventh voltage vector V7 are selected as the voltage vectors to be used for control.

FIG. 9 shows an example of a configuration in which either of the zeroth voltage vector V0 and the seventh voltage vector V7 is used as the null voltage vector to minimize the number of switching operations in the inverter 20. The present disclosure is not limited to this configuration. The two types of null voltage vectors V0 and V7 may be used. This configuration corresponds to FIG. 7C, described above.

Next, determination of the time ratios as shown in FIG. 9 will be described.

In FIG. 5, described above, an instantaneous space vector corresponding to each of the voltage vectors V0 to V7 is shown. Based on the instantaneous space vectors, the space vector Vαβ is defined as an expression (eq3) below. In the expression (eq3), j is an imaginary number.

$$V_{\alpha\beta} = \sqrt{\frac{2}{3}} \left( V_u \cdot e^{j \cdot 0} + V_v \cdot e^{j\frac{2\pi}{3}} + V_w \cdot e^{j\frac{4\pi}{3}} \right) \tag{eq3}$$

Figure 10:
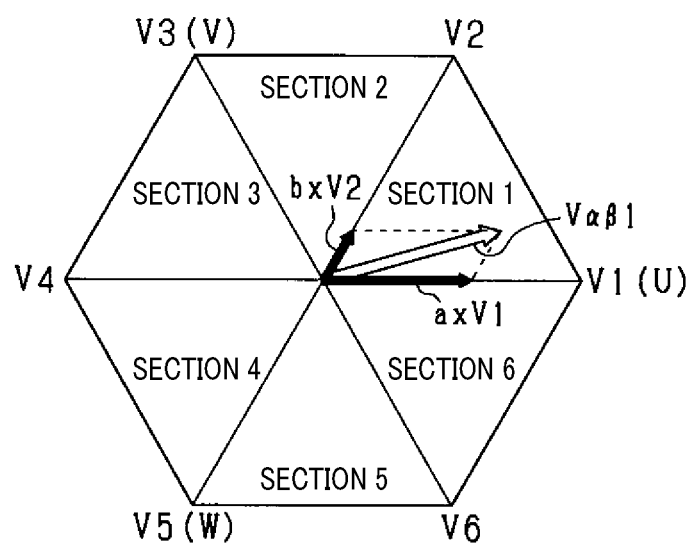
FIG. 10 is a diagram of a space vector that is divided into six sections in correspondence to the 60-degree voltage vectors.

First, the 60-degree voltage vectors are expressed by the space vector. As shown in FIG. 10, six sections 1 to 6 are demarcated by six types of active voltage vectors that are arranged so as to be shifted by 60 degrees. An example in which the space vector Vαβ1 belongs to section 1 will be described. In this case, the space vector is expressed by an expression (eq4) below, using the phase voltages Vu, Vv, and Vw based on the expression (eq3) above.

$$V_{\alpha\beta 1} = \sqrt{\frac{2}{3}} \left\{ V_u \cdot e^{j \cdot 0} - V_v \left( e^{j \cdot 0} + e^{j\frac{4\pi}{3}} \right) + V_w \cdot e^{j\frac{4\pi}{3}} \right\} \tag{eq4}$$

$$= \sqrt{\frac{2}{3}} \left\{ (V_u - V_v)e^{j \cdot 0} + (V_v - V_w)e^{j\frac{\pi}{3}} \right\}$$

Meanwhile, the space vector Vαβ1 is expressed by an expression (eq5) below, using the instantaneous space vector shown in FIG. 5. In the expression (eq5) below, a and b are coefficients.

$$V_{\alpha\beta 1} = a \cdot V_1 + b \cdot V_2 \tag{eq5}$$

$$= \sqrt{\frac{2}{3}} E_d \left( a \cdot e^{j \cdot 0} + b \cdot e^{j\frac{\pi}{3}} \right)$$

Through a comparison between the right sides of the expressions (eq4) and (eq5) above, the coefficients a and b can be expressed by an expression (eq6) below.

$$a = \frac{V_u - V_v}{E_d}, \quad b = \frac{V_v - V_w}{E_d} \tag{eq6}$$

As a result, as shown in FIG. 11, when the space vector Vαβ1 belongs to section 1, the time ratios of the first and second voltage vectors V1 and V2 during the single switching period Tsw are determined. The time ratios of the active voltage vectors are determined for sections 2 to 6 in a similar manner.

In FIG. 11, the time ratios of the two types of null voltage vectors V0 and V7 need not be equal. For example, in terms of reducing the number of switching operations, only either of the two types of null voltage vectors V0 and V7 may be used.

Figure 12:
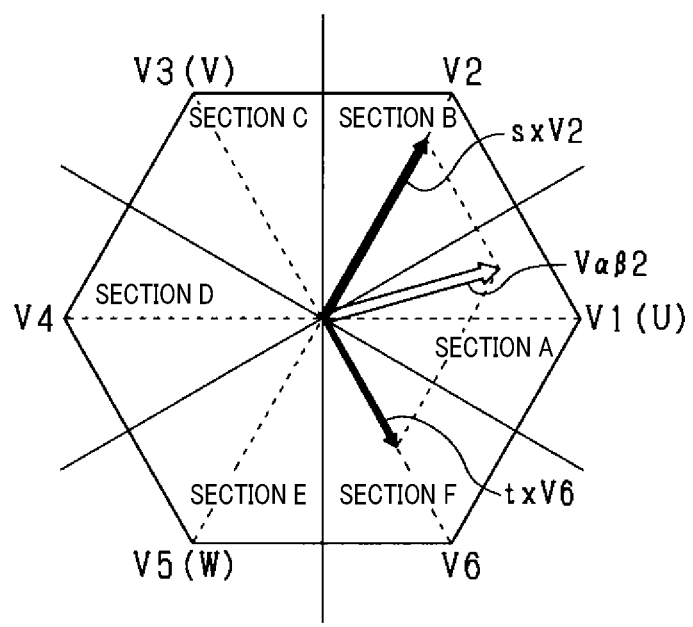
FIG. 12 is a diagram of a space vector that is divided into six sections in correspondence to the 120-degree voltage vectors.

Next, the 120-degree voltage vectors are expressed by the space vector. As shown in FIG. 12, six sections A to F are demarcated by six reference lines that are arranged so as to be shifted by 60 degrees. A pair of reference lines that demarcate section A sandwich the first voltage vector V1 and has a phase difference of 30 degrees in relation to the first voltage vector V1. An example in which the space vector Vαβ2 belongs section A will be described. In this case, the space vector is expressed by an expression (eq7) below, using the phase voltages Vu, Vv, and Vw, based on the expression (eq3) above.

$$V_{\alpha\beta2} = \sqrt{\frac{2}{3}} \left\{ -V_u \left( e^{j\frac{2\pi}{3}} + e^{j\frac{4\pi}{3}} \right) + V_v e^{j\frac{2\pi}{3}} + V_w \cdot e^{j\frac{4\pi}{3}} \right\} \quad \text{(eq7)}$$

$$= \sqrt{\frac{2}{3}} \left\{ (V_u - V_w) e^{j\frac{\pi}{3}} + (-V_u + V_v) e^{j\frac{2\pi}{3}} \right\}$$

Meanwhile, the space vector Vαβ2 is expressed by an expression (eq8) below, using the instantaneous space vector shown in FIG. 5. In the expression (eq8) below, s and t are coefficients.

$$V_{\alpha\beta2} = s \cdot V_2 + t \cdot V_6 \quad \text{(eq8)}$$

$$= \sqrt{\frac{2}{3}} E_d \left( s \cdot e^{j\frac{\pi}{3}} + t \cdot e^{j\frac{5\pi}{3}} \right)$$

$$= \sqrt{\frac{2}{3}} E_d \left( s \cdot e^{j\frac{\pi}{3}} - t \cdot e^{j\frac{2\pi}{3}} \right)$$

Through a comparison between the right sides of the expressions (eq7) and (eq8) above, the coefficients s and t can be expressed by an expression (eq9) below.

$$s = \frac{V_u - V_w}{E_d}, \quad t = \frac{V_u - V_v}{E_d} \quad \text{(eq9)}$$

As a result, as shown in FIG. 13, when the space vector Vαβ2 belongs to section A, the time ratios of the second and sixth voltage vectors V2 and V6 during the single switching period Tsw are determined. The time ratios of the active voltage vectors are determined for sections B to F in a similar manner.

In FIG. 13, the two types of null voltage vectors V0 and V7 may be used. In this case, for example, the time ratios of the two types of null voltage vectors V0 and V7 may be equal.

Figure 14:
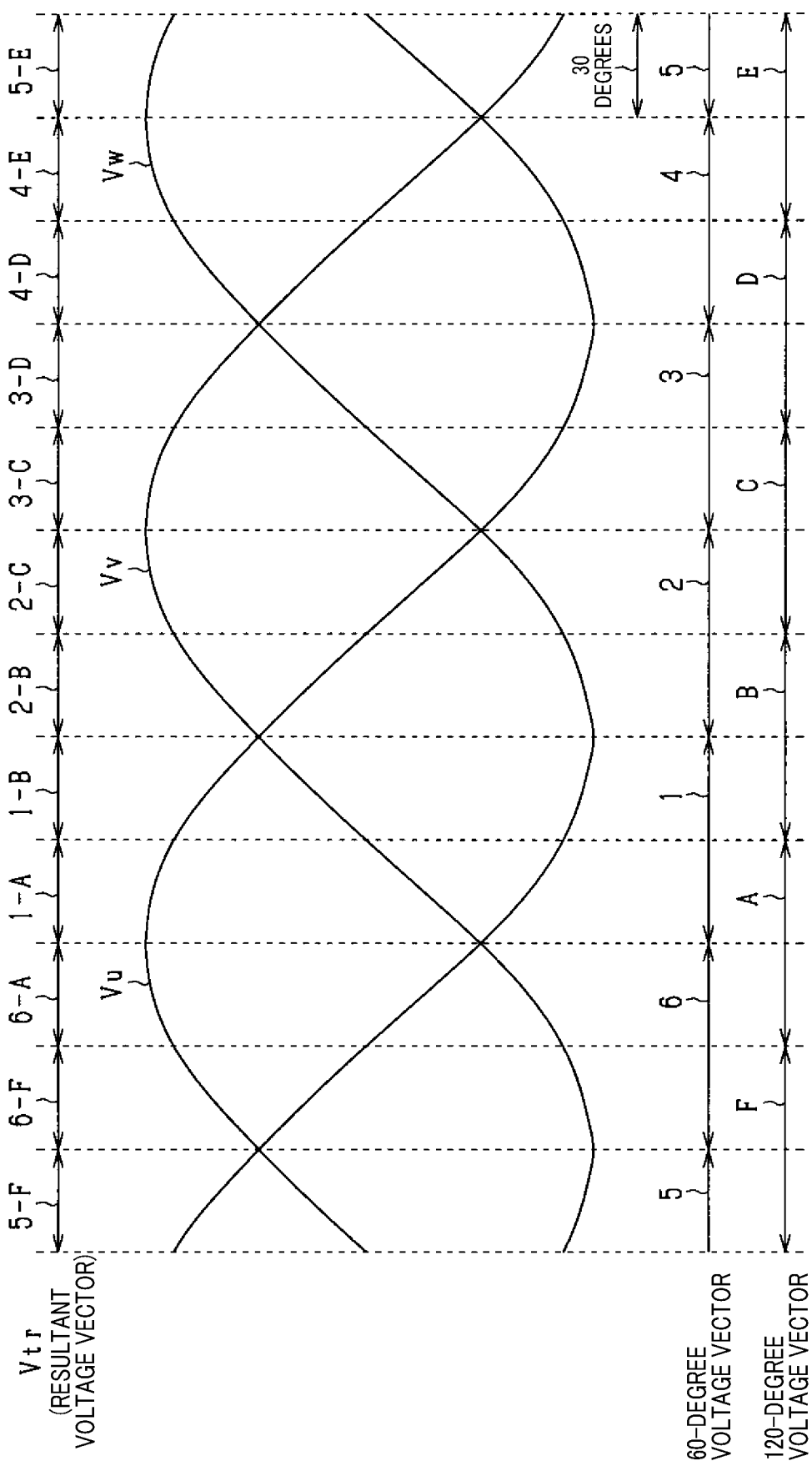
FIG. 14 is a diagram of transitions in section and transitions in each phase voltage.

Demarcation into the twelve sections shown in FIG. 8 is achieved by sections 1 to 6 shown in FIG. 10 and sections A to F shown in FIG. 12 being overlapped. Then, through use of the time ratios of the active voltage vectors shown in FIG. 11 and FIG. 13 and the ratio coefficient k, the time ratios corresponding to each of the twelve sections are determined as shown in FIG. 9. FIG. 14 shows the transitions in the section to which the command voltage vector Vtr belongs and the transitions in the phase voltages Vu, Vv, and Vw.

Figure 15:
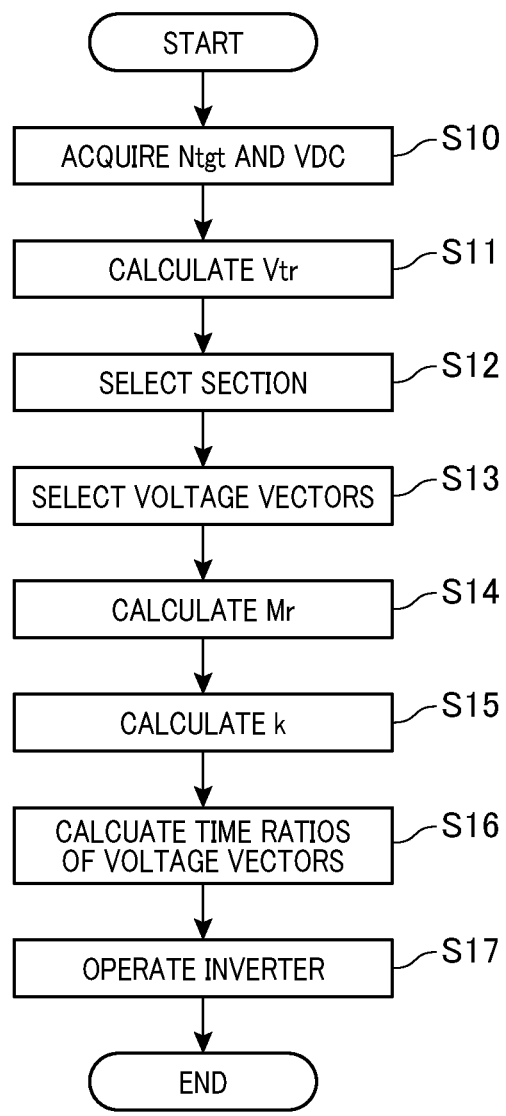
FIG. 15 is a flowchart of the steps in a control process for the rotating electric machine.

FIG. 15 shows the steps in a control process for the rotating electric machine 10 that is performed by the control apparatus 30. For example, the control apparatus 30 repeatedly performs the control process at a predetermined processing period.

In this series of processes, at step S10, the control apparatus 30 acquires the command rotational speed Ntgt of the rotating electric machine 10 and the power supply voltage VDC detected by the voltage detecting unit 51.

At subsequent step S11, the control apparatus 10 calculates the command voltage vector Vtr for controlling the rotational speed of the rotating electric machine 10 to the command rotating speed Ntgt, based on the command rotational speed Ntgt. Step S11 corresponds to a voltage vector calculating unit.

At step S12, the control apparatus 30 selects the section to which the command voltage vector Vtr calculated at step S11 belongs, from the twelve sections shown in FIG. 8.

At step S13, the control apparatus 30 selects the voltage vectors that correspond to the section selected at step S12 based on the information shown in FIG. 9. The active voltage vectors and the null voltage vectors are included in the voltage vectors to be selected.

A method for selecting the active voltage vectors will be described. The control apparatus 30 selects two types of active voltage vectors that sandwich the command voltage vector Vtr and have a phase difference of 60 degrees therebetween. In addition, of the two types of active voltage vectors that sandwich the command voltage vector Vtr and have a phase difference of 120 degrees therebetween, the control apparatus 30 selects the active voltage vector that differs from the two types of active voltage vectors selected earlier and is closest to the command voltage vector Vtr.

For example, when the selected section is section 1-B, the control apparatus 30 selects the first and second voltage vectors V1 and V2 as the two types of active voltage vectors that sandwich the command voltage vector Vtr and have a phase difference of 60 degrees therebetween. In addition, the control apparatus 30 selects the third voltage vector V3 as the active voltage vector that is closest to the command voltage vector Vtr. The control apparatus 30 selects the zeroth voltage vector V0 as the null voltage vector. According to the present embodiment, step S13 corresponds to first and second selecting units.

At step S14, the control apparatus 30 calculates a modulation ratio Mr based on the magnitude of the command voltage vector Vtr and the power supply voltage VDC. According to the present embodiment, the control apparatus 30 calculates the modulation ratio Mr based on an expression (eq10) below. In the expression (eq10) below, Vm denotes the amplitude of the phase voltages Vu, Vv, and Vw. For example, the amplitude Vm may be calculated based on the command voltage vector Vtr.

$$M_r = \frac{V_m}{\frac{VDC}{2}} \quad \text{(eq10)}$$

Figure 16:
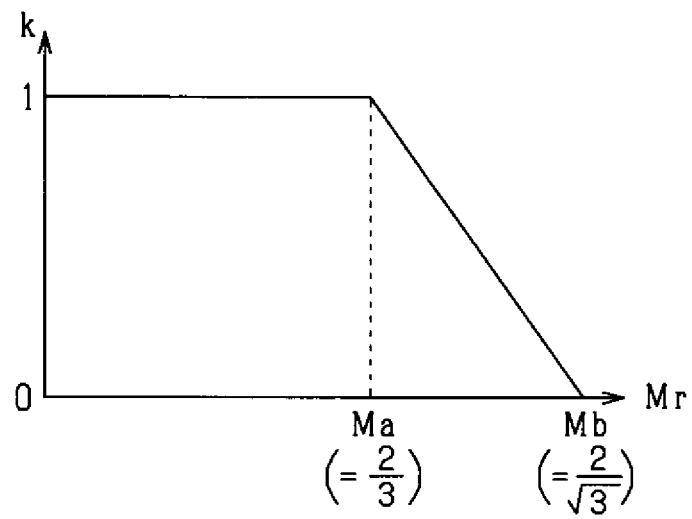
FIG. 16 is a diagram of a method for setting a ratio coefficient.

At step S15, the control apparatus 30 calculates the ratio coefficient k based on the calculated modulation ratio Mr. According to the present embodiment, as shown in FIG. 16, when the modulation ratio Mr is equal to or greater than zero and equal to or less than a first modulation ratio Ma, the ratio coefficient k is 1. Meanwhile, when the modulation ratio Mr is greater than the first modulation ratio Ma and equal to or less than a second modulation ratio Mb (>Ma), the control apparatus 30 calculates the ratio coefficient k to decrease as the modulation ratio Mr increases. When the modulation ratio Mr is the second modulation ratio Mb, the ratio coefficient is zero.

According to the present embodiment, the first modulation ratio Ma is set to 2/3. A reason for this is that the maximum amplitude value of the phase voltage that can be applied to a space vector modulation method in which the 120-degree voltage vectors can be used is 2/3 of the maximum amplitude value of the phase voltage that can be outputted in a triangular-wave comparison modulation method.

In addition, the second modulation ratio Mb is set to 2/√3 (square root of 3). A reason for this is that the maximum amplitude value of the phase voltage that can be applied to the space vector modulation method in which the 60-degree voltage vectors can be used is 2/√3 (square root of 3) of the maximum amplitude value of the phase voltage that can be outputted in the triangular-wave comparison modulation method.

That is, according to the present embodiment, when the modulation ratio Mr is equal to or less than the first modulation ratio Ma, space vector modulation using only the 120-degree voltage vectors, of the 60-degree and 120-degree voltage vectors, is performed. Specifically, for example, when the selected section is section 1-A, space vector modulation using the active voltage vectors of section A shown in FIG. 13 is performed.

Meanwhile, when the modulation ratio Mr is greater than the first modulation ratio Ma and less than the second modulation ratio Mb, space vector modulation using both the 60-degree and 120-degree voltage vectors is performed. In this case, the ratio of the appearance time of the 60-degree voltage vector during the single switching period Tsw increases as the modulation ratio Mr increases. As a result, even in the high modulation-ratio range, the maximum value of the magnitude of the voltage vector that can be outputted can be increased.

According to the present embodiment, when the modulation ratio Mr is greater than the first modulation ratio Ma and less than the second modulation ratio Mb, the total appearance time of the three types of active voltage vectors selected at step S13 is longer than that when the 60-degree voltage vectors are used.

Moreover, when the modulation ratio Mr is the second modulation ratio Mb, space vector modulation using only the 60-degree voltage vectors, of the 60-degree and 120-degree voltage vectors, is performed. Specifically, for example, when the selected section is section 1-A, space vector modulation using the active voltage vectors of section 1 shown in FIG. 11 is performed.

At step S16, the control apparatus 30 calculates the time ratio of each voltage vector selected at step S13 during the single switching period Tsw, based on the phase voltages Vu, Vv, and Vw, and the power supply voltage VDC. For example, when the selected section is section 1-A, the control apparatus 30 calculates the time ratios of the first, second, sixth, and seventh voltage vectors V1, V2, V6, and V7. For example, the phase voltages Vu, Vv, and Vw used at step S16 may be calculated based on the command voltage vector Vtr and the electrical angle θe.

At step S17, the control apparatus 30 operates the inverter 20 such that the voltage vectors selected at step S13 have the time ratios calculated at step S16. As a result, the voltage vector applied to the rotating electric machine 10 is controlled to the command voltage vector Vtr. The rotational speed of the rotating electric machine 10 is controlled to the command rotational speed Ntgt. According to the present embodiment, step S17 corresponds to an operating unit.

Figure 17:
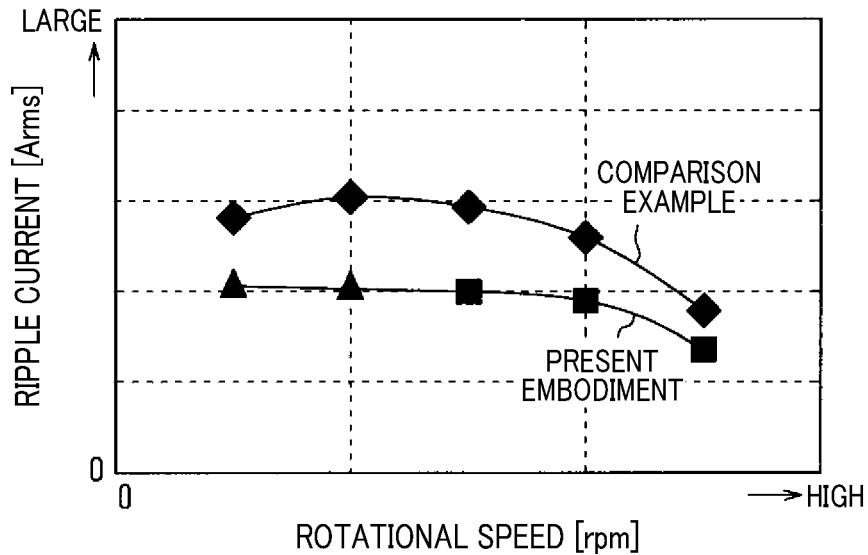
FIG. 17 is a diagram of a ripple-current reduction effect.

FIG. 17 shows the effects according to the present embodiment. In FIG. 17, a horizontal axis indicates the rotational speed of the rotating electric machine 10. A vertical axis indicates an effective value of the ripple current flowing to the capacitor 21. As a comparison example, FIG. 17 also shows the results of space vector modulation in which only the 60-degree voltage vectors, of the 60-degree and 120-degree voltage vectors, are used. As shown in FIG. 17, according to the present embodiment, the effective value of the ripple current flowing to the capacitor 21 in the range of the rotational speeds used in the rotating electric machine 10 can be reduced compared to that of the comparison example.

In addition, according to the present embodiment, the rotating electric machine 10 is used as a motor that drives a fan or a pump. In the fan or pump, torque increases in proportion to the rotational speed. Therefore, the ripple current that flows to the capacitor 21 increases in the high rotational speed range of the rotating electric machine 10. Consequently, the advantages in application of the present embodiment to the rotating electric machine 10 such as that described above are significant.

Second Embodiment

A second embodiment will be described below with reference to the drawings, mainly focusing on the differences with the above-described first embodiment.

According to the present embodiment, the ratio coefficient k is calculated such that the null voltage vector is not used. According to the present embodiment, the inverter 20 is operated such that the null voltage vector does not appear as a voltage vector that is applied to the rotating electric machine 10.

Figure 18:
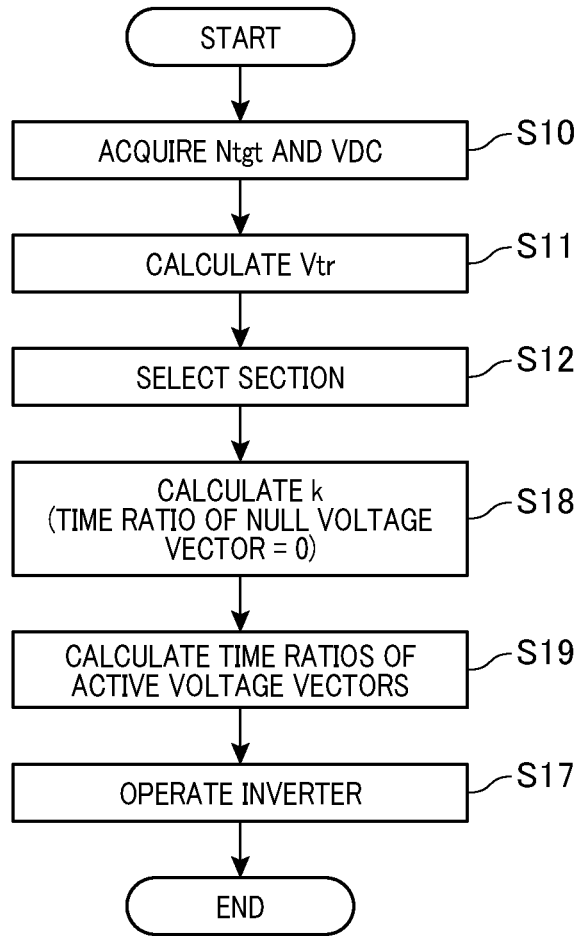
FIG. 18 is a flowchart of the steps in a control process for a rotating electric machine according to a second embodiment.

FIG. 18 shows the steps in a control process for the rotating electric machine 10 that is performed by the control apparatus 30. For example, the control apparatus 30 repeatedly performs the control process at a predetermined processing period. In FIG. 18, processes that are identical to those in FIG. 15, described above, are given the same reference numbers for convenience.

After completing step S12, the control apparatus 30 proceeds to step S18. The control apparatus 30 calculates the ratio coefficient k such that the null voltage vector does not appear during the single switching period Tsw. Specifically, the control apparatus 30 calculates the ratio coefficient k at which the time ratio of the null voltage vector corresponding to the section selected at step S12 becomes zero, based on the phase voltages Vu, Vv, and Vw, and the power supply voltage VDC.

For example, when the selected section is section 1-A, the control apparatus 30 calculates the ratio coefficient k as expressed by an expression (eq11) below, to set the time ratio of the seventh voltage vector V7 shown in FIG. 9 to zero.

$$1 - \frac{(1+k)V_u - k \cdot V_v - V_w}{E_d} = 0 \quad \text{(eq11)}$$

$$\rightarrow k = \frac{1 - \frac{V_u - V_w}{E_d}}{\frac{V_u - V_v}{E_d}}$$

Figure 19:
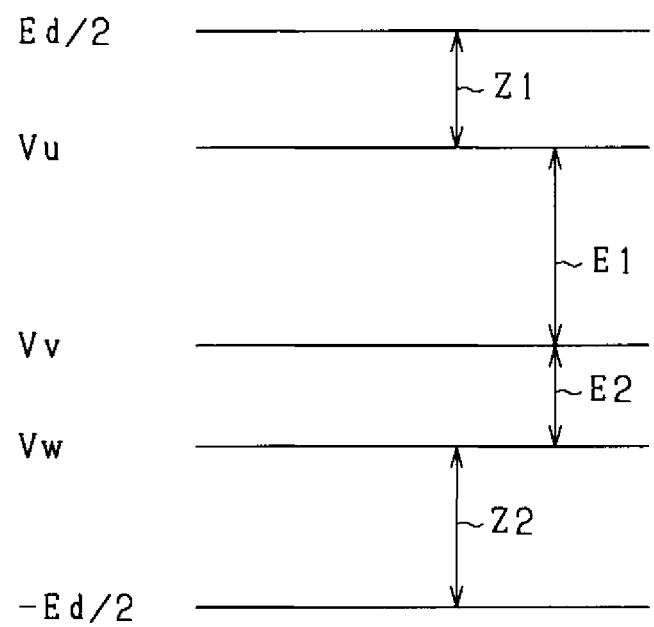
FIG. 19 is a diagram for explaining the ratio coefficient.

The ratio coefficient k is equivalent to a value obtained by the appearance time of the null voltage vector corresponding to the selected section being divided by the longer of the appearance times of the two active voltage vectors corresponding to the selected section. For example, when the selected section is section 1-A, as shown in FIG. 19, the ratio coefficient k is equivalent to a value obtained by the appearance time "Z1+Z2" of the null voltage vector being divided by time E1 that is the longer of the appearance times E1 and E2 of the 60-degree voltage vectors V1 and V2 in section 1-A.

It is known that the ratio coefficient k at which the time ratio of the null voltage vector becomes zero in each section is dependent on the phase voltages Vu, Vv, and Vw, and the power supply voltage VDC. Therefore, the ratio coefficient k may be calculated based on map information in which the phase voltages Vu, Vv, and Vw, and the power supply voltage VDC are associated with the ratio coefficient k.

At step S19, the control apparatus 30 calculates the time ratios of the active voltage vectors corresponding to the section selected at step S12, based on the ratio coefficient k calculated at step S18. For example, when the selected section is section 1-A, the time ratios of the first, second, and sixth voltage vectors V1, V2, and V6 shown in section 1-A in FIG. 9 are calculated. At step S17, the control apparatus 30 operates the inverter 20 such that each active voltage vector corresponding to the section selected at step S12 has the time ratio calculated at step S19.

According to the present embodiment described above, the null voltage vector of the resultant voltage vector applied to the rotating electric machine 10 can be zero. Therefore, the rotating electric machine 10 can be controlled using the active voltage vectors at all times in a single electrical angle period.

Third Embodiment

A third embodiment will be described below with reference to the drawings, mainly focusing on the differences with the above-described first embodiment.

According to the above-described first embodiment, the active voltage vector that is closest to the command voltage vector Vtr is selected as the active voltage vector that differs from the 60-degree voltage vectors, among the 120-degree voltage vectors. In this regard, according to the present embodiment, an active voltage vector that corresponds to a phase of which the absolute value of the phase current is the largest, among the U, V, and W phases, is selected as the active voltage vector that differs from the 60-degree voltage vectors, among the 120-degree voltage vectors.

Figure 20:
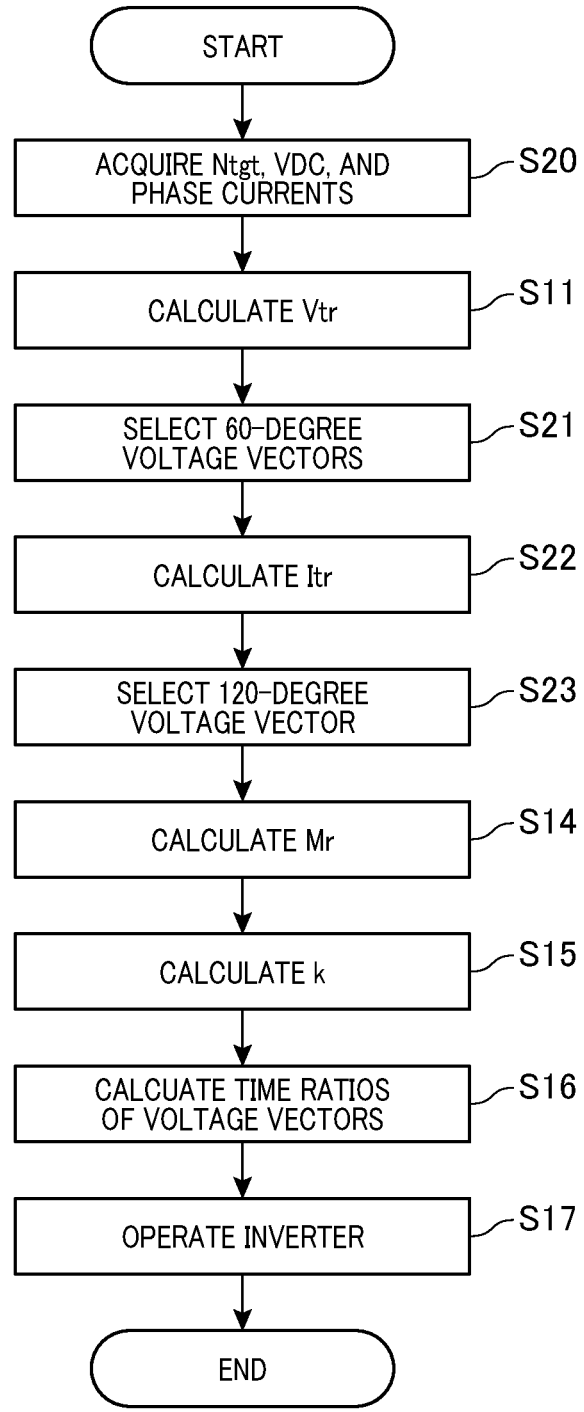
FIG. 20 is a flowchart of the steps in a control process for a rotating electric machine according to a third embodiment.

FIG. 20 shows the steps in a control process for the rotating electric machine 10 that is performed by the control apparatus 30. For example, the control apparatus 30 repeatedly performs the control process at a predetermined processing period. In FIG. 20, processes that are identical to those in FIG. 15, described above, are given the same reference numbers for convenience.

At step S20, the control apparatus 30 acquires the phase currents detected by the current detecting unit 50, in addition to the command rotational speed Ntgt and the power supply voltage VDC. Subsequently, the control apparatus 30 performs step S11 and then proceeds to step S21.

At step S21, the control apparatus 30 selects two types of active voltage vectors that sandwich the command voltage vector Vtr calculated at step S11 and have a phase difference of 60 degrees therebetween. For example, when the section to which the command voltage vector Vtr belongs is section 1 in FIG. 10, the control apparatus 30 selects the first and second voltage vectors V1 and V2. According to the present embodiment, step S21 corresponds to the first selecting unit.

At step S22, the control apparatus 30 calculates a current vector Itr of the current that flows to the rotating electric machine 10 based on the phase currents acquired at step S20 and the electrical angle θe.

At step S23, the control apparatus 30 selects the active voltage vector differing from the active voltage vectors selected at step S21, of the two types of active voltage vectors that sandwich the active voltage vector corresponding to the phase of which the absolute value of the phase current is the largest, and have a phase difference of 120 degrees therebetween. Specifically, for example, when the current vector Itr calculated at step S22 belongs to section A shown in FIG. 21, the absolute value of the U-phase current is greater than the absolute values of the V-phase and W-phase currents.

Therefore, of the second and sixth voltage vectors V2 and V6 that sandwich the first voltage vector V1 corresponding to the U phase and have a phase difference of 120 degrees, the sixth voltage vector V6 that differs from the second voltage vector V2 selected at step S21 is selected. As a result, the second and sixth voltage vectors V2 and V6 are used as the 120-degree voltage vectors. The W-phase current corresponding to the second voltage vector V2 and the V-phase current corresponding to the sixth voltage vector V6 flow as the inverter current Idc.

According to the above-described first embodiment, even when the current vector Itr belongs to section A, in a case where the command voltage vector Vtr belongs to section 1-B, the third voltage vector V3 that is close to the command voltage vector Vtr is selected as one of the 120-degree voltage vectors, instead of the sixth voltage vector V6.

When the current vector Itr belongs to section B, the absolute value of the W-phase current is greater than the absolute values of the U-phase and V-phase currents. At this time, of the two types of active voltage vectors that sandwich the second voltage vector V2 corresponding to the W phase and have a phase difference of 120 therebetween, the active voltage vector that differs from the active voltage vector selected at step S21 is selected.

In addition, when the current vector Itr belongs to section C, the absolute value of the V-phase current is greater than the absolute values of the U-phase and W-phase currents. At this time, of the two types of active voltage vectors that sandwich the third voltage vector V3 corresponding to the V phase and have a phase difference of 120 therebetween, the active voltage vector that differs from the active voltage vector selected at step S21 is selected.

Furthermore, when the current vector Itr belongs to section D, the absolute value of the U-phase current is greater than the absolute values of the V-phase and W-phase currents. At this time, of the two types of active voltage vectors that sandwich the fourth voltage vector V4 corresponding to the U phase and have a phase difference of 120 therebetween, the active voltage vector that differs from the active voltage vector selected at step S21 is selected.

Still further, when the current vector Itr belongs to section E, the absolute value of the W-phase current is greater than the absolute values of the U-phase and V-phase currents. At this time, of the two types of active voltage vectors that sandwich the fifth voltage vector V5 corresponding to the W phase and have a phase difference of 120 therebetween, the active voltage vector that differs from the active voltage vector selected at step S21 is selected.

Moreover, when the current vector Itr belongs to section F, the absolute value of the V-phase current is greater than the absolute values of the U-phase and W-phase currents. At this time, of the two types of active voltage vectors that sandwich the sixth voltage vector V6 corresponding to the V phase and have a phase difference of 120 therebetween, the active voltage vector that differs from the active voltage vector selected at step S21 is selected.

According to the present embodiment, step S23 corresponds to the second selecting unit.

After completing step S23, the control apparatus 30 performs steps S14 and S15, and then proceeds to step S16. At step S16, the control apparatus 30 calculates the time ratios of the active voltage vectors and null voltage vector selected at step S21 and S23, based on the ratio coefficient k calculated at step S15, the phase voltages Vu, Vv, and Vw, and the power supply voltage VDC. For example, when the active voltage vectors selected at steps S21 and S23 are the first, second, and sixth voltage vectors V1, V2, and V6, the seventh voltage vector V7 corresponding to section 1-A in FIG. 9 is selected as the null voltage vector. The time ratios of the voltage vectors V1, V2, V6, and V7 corresponding to section 1-A in FIG. 9 are calculated.

Next, the effects according to the present embodiment will be described with reference to FIG. 22A and FIG. 22B.

Figure 22A:
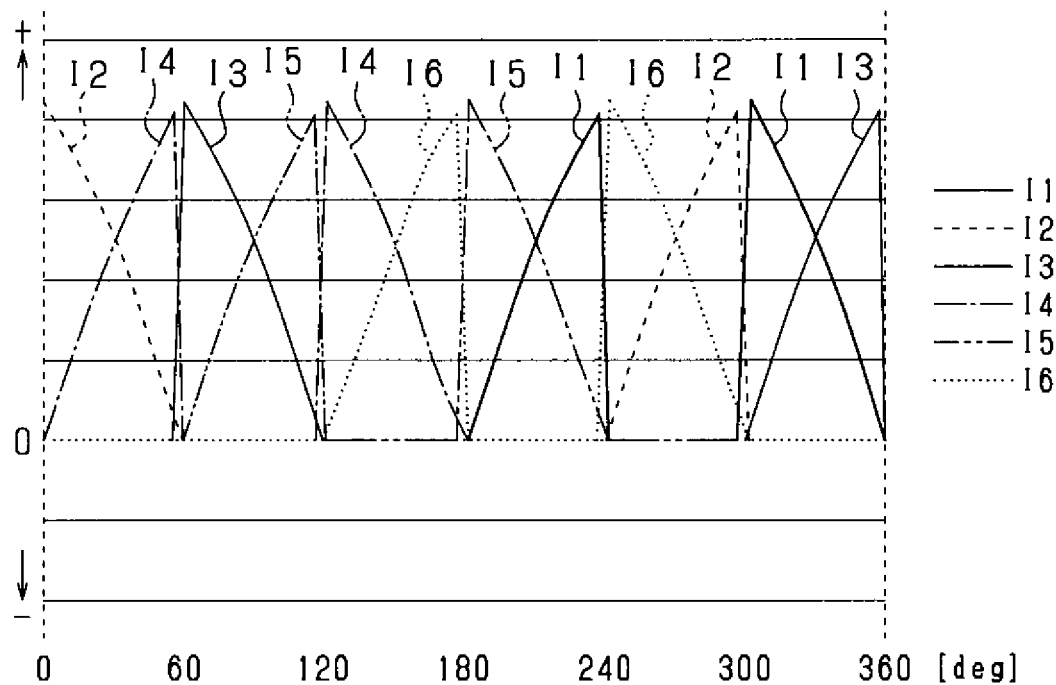
FIG. 22A and FIG. 22B are diagrams of a peak-value reduction effect on an inverter current.
Figure 22B:
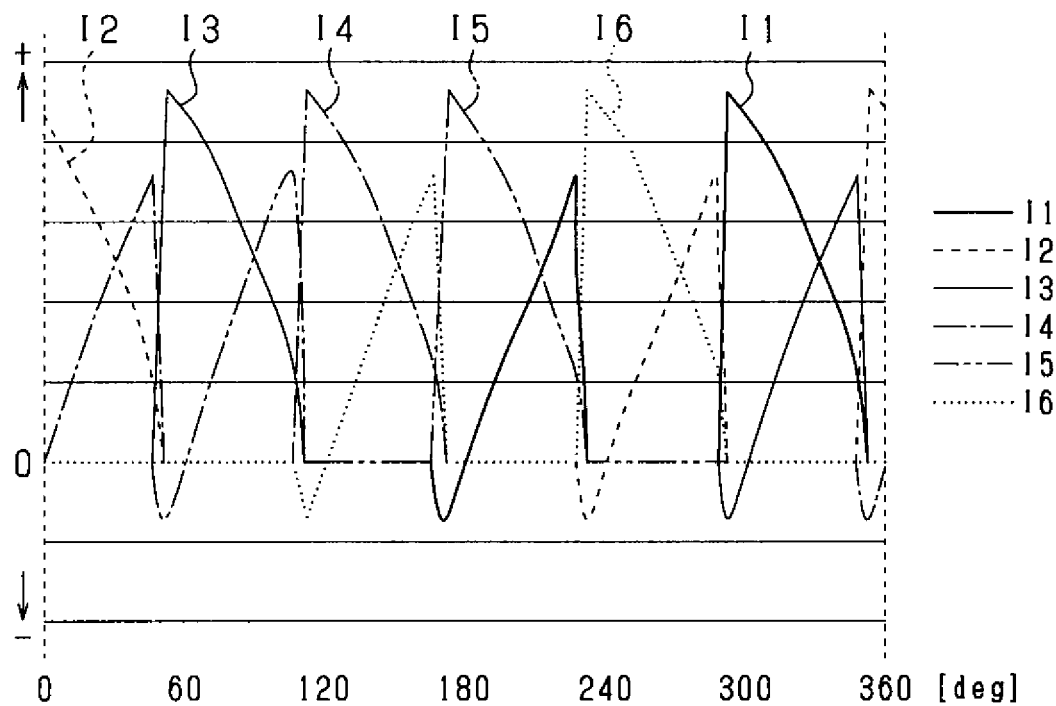

In FIG. 22A and FIG. 22B, I1 indicates the transitions in a current component that is included in the capacitor current Icf when the first voltage vector V1 is selected as the 120-degree voltage vector. In a similar manner, I2 to I6 respectively indicate the transitions in the current component that is included in the capacitor current Icf when the second to sixth voltage vectors V2 to V6 are selected as the 120-degree voltage vector.

FIG. 22A shows the transitions in the current according to the present embodiment. FIG. 22B shows the transitions in the current according to the first embodiment as a comparison example. Horizontal axes in FIG. 22A and FIG. 22B indicate electrical angle. Each scale mark on the vertical axis in FIG. 22A matches that of the vertical axis in FIG. 22B.

Figure 21:
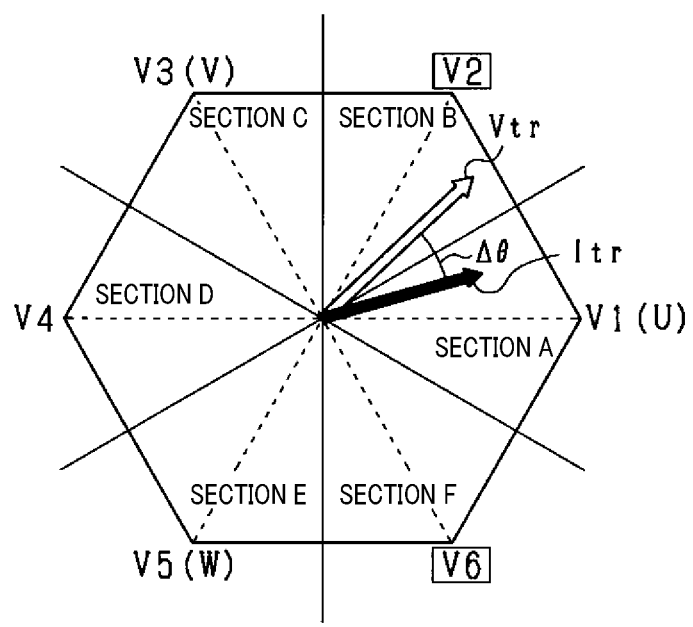
FIG. 21 is a diagram of a phase difference between a voltage vector and a current vector.

According to the present embodiment, for example, even when a phase difference AO shown in FIG. 21 is present between the command voltage vector Vtr and the current vector Itr, the ripple current that flows to the capacitor 21 can be reduced, compared to that in the comparison example. In this regard, in the comparison example, the phase current of which the absolute value is the largest appears in the inverter current Idc. Therefore, a peak value of the inverter current Idc is greater than that according to the present embodiment. Consequently, the ripple current that flows to the capacitor 21 becomes larger than that according to the present embodiment.

As described above according to the second embodiment, a configuration in which the null voltage vector does not appear may also be used according to the present embodiment.

Fourth Embodiment

A fourth embodiment will be described below with reference to the drawings, mainly focusing on the differences with the above-described third embodiment.

The phase difference AO between the command voltage vector Vtr and the current vector Itr may change based on a driving state of the rotating electric machine 10. Therefore, according to the present embodiment, when an absolute value of the phase difference AO is equal to or less than a phase threshold θth, the rotating electric machine 10 is controlled by the process shown in FIG. 15 according to the above-described first embodiment. Meanwhile, when the absolute value of the phase difference AO is greater than the phase threshold θth, the rotating electric machine 10 is controlled by the process shown in FIG. 20 according to the above-described third embodiment.

Figure 23:
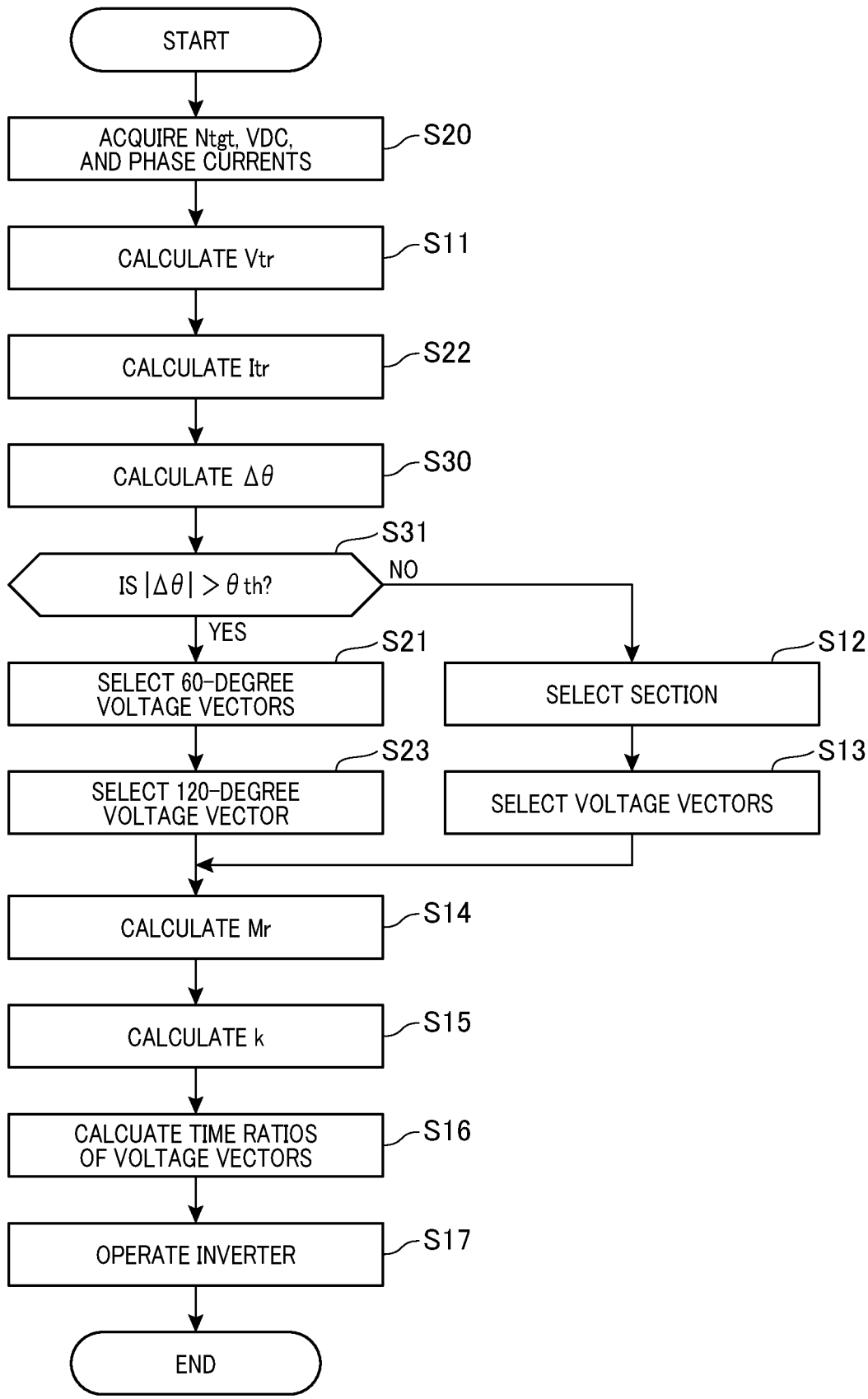
FIG. 23 is a flowchart of the steps in a control process for a rotating electric machine according to a fourth embodiment.

FIG. 23 shows the steps in a control process for the rotating electric machine 10 that is performed by the control apparatus 30. For example, the control apparatus 30 repeatedly performs the control process at a predetermined processing period. In FIG. 23, processes that are identical to those in FIG. 15 or 20, described above, are given the same reference numbers for convenience.

After completing step S20, the control apparatus 30 performs steps S11 and S22 and proceeds to step S30. At step S30, the control apparatus calculates the phase difference AO between the command voltage vector Vtr calculated at step S11 and the current vector Itr calculated at step S22.

At step S31, the control apparatus 30 determines whether or not the absolute value of the phase difference AO calculated at step S30 is greater than the phase threshold θth. When determined NO at step S31, the control apparatus 30 performs steps S12 and S13 and proceeds to step S14. When determined YES at step S31, the control apparatus 30 performs steps S21 and S23 and proceeds to step S14. According to the present embodiment, step S31 corresponds to a determining unit.

According to the present embodiment described above, the ripple current that flows to the capacitor 21 can be reduced under circumstances in which the ripple current may increase.

OTHER EMBODIMENTS

The above-described embodiments may be modified in the following manner.

The process at step S31 in FIG. 23 according to the above-described fourth embodiment may be replaced with a process in which whether or not the magnitude of the current vector Itr is greater than a predetermined value is determined. When determined that the magnitude of the current vector Itr is greater than the predetermined value, the control apparatus 30 proceeds to step S21. This process is based on the phase difference between the voltage vector and the current vector increasing under circumstances in which the current that flows to the rotating electric machine 10 increases.

In addition, the process at step S31 may be replaced with a process in which whether or not the command rotational speed Ntgt is higher than a predetermined rotational speed is determined. When determined that the command rotational speed Ntgt is higher than the predetermined rotational speed, the control apparatus 30 proceeds to step S21. This process is based on the output torque of the rotating electric machine 10 increasing and the current that flows to the rotating electric machine 10 increasing as the rotational speed of the rotating electric machine 10 increases.

The first modulation ratio Ma shown in FIG. 16 may be set to a value that is greater than zero and less than 2/3.

The capacitor 21 is not limited to that provided inside the inverter 20. The capacitor 21 may be provided outside of the inverter 20.

The switches that configure the power conversion circuit 22 is not limited to the N-channel MOSFETs. For example, insulated-gate bipolar transistors (IGBTs) may be used. In this case, all that is required is that free-wheeling diodes be connected in antiparallel to the IGBTs.

The controlled variable of the rotating electric machine 10 is not limited to the rotational speed and may, for example, be torque.

The number of phases of the rotating electric machine 10 may be other than three. In addition, the rotating electric machine 10 is not limited to a synchronous machine and may, for example, be an induction machine.

A driving target of the rotating electric machine 10 is not limited to a fan or a pump.

What is claimed is:

1. A control apparatus for a rotating electric machine that is applied to a control system, the control system including a power conversion circuit that performs switching operations to convert direct-current power from a direct-current power supply to alternating-current power and to output the alternating-current power, a rotating electric machine to which the alternating-current power outputted from the power conversion circuit is supplied, and a capacitor that is connected in parallel to the direct-current power supply and provided on an input side of the power conversion circuit, the control apparatus comprising:

a first selecting unit that selects two types of active voltage vectors that sandwich a command voltage vector applied to the rotating electric machine from the power conversion circuit and have a phase difference of 60 degrees therebetween;

a second selecting unit that selects, of two types of active voltage vectors that sandwich the command voltage vector and have a phase difference of 120 degrees therebetween, one of two types of active voltage vectors that differs from the two types of active voltage vectors selected by the first selecting unit, based on a driving state of the rotating electric machine; and an operating unit that controls the power conversion apparatus to perform switching operations to control the rotating electric machine, based on the two types of active voltage vectors selected by the first selecting unit and the one of two types of active voltage vectors selected by the second selecting unit, wherein:

the second selecting unit selects, of two types of active voltage vectors that sandwich an active voltage vector corresponding to a phase of which an absolute value of a phase current is the largest and have a phase difference of 120 degrees therebetween, one of two types of active voltage vectors that differs from the two types of active voltage vectors selected by the first selecting unit, based on each phase current flowing to the rotating electric machine.

2. The control apparatus for a rotating electric machine according to claim 1, further comprising:

a determining unit that determines whether or not a phase difference between a current vector that flows to the rotating electric machine and the command voltage vector exceeds a threshold, wherein the second selecting unit selects, of the two types of active voltage vectors that sandwich the command voltage vector and have a phase difference of 120 degrees therebetween, one of two types of active voltage vectors that differs from the two types of active voltage vectors selected by the first selecting unit and is closest to the command voltage vector, based on the command voltage vector, when the determining unit determines that the phase difference is equal to or less than the threshold, and selects, of the two types of active voltage vectors that sandwich the active voltage vector corresponding to the phase of which the absolute value of the phase current is the largest and have a phase difference of 120 degrees therebetween, the one of two types of active voltage vectors that differs from the two types of active voltage vectors selected by the first selecting unit, based on each phase current flowing to the rotating electric machine, when the determining unit determines that the phase difference exceeds the threshold.

3. The control apparatus for a rotating electric machine according to claim 2, wherein:

the operating unit controls the power conversion apparatus to perform switching operations such that ratios of appearance times of the two types of active voltage vectors selected by the first selecting unit during a single switching period of the power conversion circuit increase as a modulation ratio of an output voltage of the power conversion circuit increases, when the modulation ratio exceeds a predetermined modulation ratio.

4. The control apparatus for a rotating electric machine according to claim 2, wherein:

the operating unit operates the power conversion circuit by a switching operation such that a null voltage vector does not appear as a voltage vector that is applied to the rotating electric machine.

5. The control apparatus for a rotating electric machine according to claim 2, wherein:

the rotating electric machine is a motor that drives a fan or a pump.

6. The control apparatus for a rotating electric machine according to claim 3, wherein:

the predetermined modulation ratio is 2/3.

7. The control apparatus for a rotating electric machine according to claim 1, wherein:

the operating unit controls the power conversion apparatus to perform switching operations such that ratios of appearance times of the two types of active voltage vectors selected by the first selecting unit during a single switching period of the power conversion circuit increase as a modulation ratio of an output voltage of the power conversion circuit increases, when the modulation ratio exceeds a predetermined modulation ratio.

8. The control apparatus for a rotating electric machine according to claim 7, wherein:

the predetermined modulation ratio is 2/3.

9. The control apparatus for a rotating electric machine according claim 7, wherein:

the rotating electric machine is a motor that drives a fan or a pump.

10. The control apparatus for a rotating electric machine according to claim 8, wherein:

the rotating electric machine is a motor that drives a fan or a pump.

11. The control apparatus for a rotating electric machine according to claim 1, wherein:

the operating unit operates the power conversion circuit by a switching operation such that a null voltage vector does not appear as a voltage vector that is applied to the rotating electric machine.

12. The control apparatus for a rotating electric machine according to claim 11, wherein:

the rotating electric machine is a motor that drives a fan or a pump.

13. The control apparatus for a rotating electric machine according to claim 1, wherein:

the rotating electric machine is a motor that drives a fan or a pump.

* * * * *